US012762577B1

(12) United States Patent
Lee

(10) Patent No.: US 12,762,577 B1
(45) Date of Patent: Oct. 13, 2026

(54) EXECUTION-TIME RELEASE CONTROL PLANE USING VALIDATED DECISION RECEIPTS, THEN-CURRENT RELEASE STATE, AND FAIL-CLOSED ACTION CONTROL

(71) Applicant: Yong Bok Lee, Sheridan, WY (US)

(72) Inventor: Yong Bok Lee, Sheridan, WY (US)

(73) Assignee: THE CROWN AND THE CROSS LLC, Sheridan, WY (US)

(*) Notice: Subject to any disclaimer, the term of this patent is extended or adjusted under 35 U.S.C. 154(b) by 0 days.

(21) Appl. No.: 19/569,924

(22) Filed: Mar. 17, 2026

(51) Int. Cl.

| | |
|---|---|
| ***G06Q 10/10*** | (2023.01) |
| ***G06Q 10/06*** | (2023.01) |
| ***G06Q 20/40*** | (2012.01) |
| ***G06Q 30/018*** | (2023.01) |
| ***G06Q 30/02*** | (2023.01) |
| ***G06Q 30/06*** | (2023.01) |

(52) U.S. Cl.
CPC ........... *G06Q 30/018* (2013.01); *G06Q 20/40* (2013.01)

(58) Field of Classification Search
CPC ............................. G06Q 30/018; G06Q 20/40
USPC ........................................... 705/1.1–912, 317
See application file for complete search history.

(56) References Cited

U.S. PATENT DOCUMENTS

| | | | |
|---|---|---|---|
| 8,834,251 | B2 | 9/2014 | Yacenda |
| 9,485,206 | B2 | 11/2016 | Day, II et al. |
| 10,237,280 | B2 | 3/2019 | Day, II et al. |
| 11,082,233 | B2 | 8/2021 | Yang et al. |
| 11,556,959 | B2 | 1/2023 | Fournier et al. |
| 11,924,219 | B1 | 3/2024 | Campbell et al. |
| 12,013,924 | B1 | 6/2024 | Hanson et al. |
| 2011/0072039 | A1 | 3/2011 | Tayloe |
| 2012/0106805 | A1 | 5/2012 | Shuster |

(Continued)

OTHER PUBLICATIONS

Ryan Bachman and Mirabela Dan, "Enhance release control with AWS CodePipeline stage-level conditions," AWS DevOps & Developer Productivity Blog, Oct. 16, 2024, pp. 1-8. (Year: 2024).*

(Continued)

*Primary Examiner* — Jonathan P Ouellette

(57) ABSTRACT

A stateful release control plane controls machine-executed release-related actions for a digital asset package by requiring concurrence between a validated machine-readable decision receipt and a then-current machine-readable release state. A release gate identifies a requested action, validates the decision receipt against package continuity data, policy continuity data, action scope, and validity-condition fields, obtains a signed state object including freshness metadata, and permits the requested action only when both the validated decision receipt and the then-current release state authorize the action. When concurrence is absent, the release gate prevents execution in a fail-closed manner, outputs machine-readable reason codes, and records an action-scoped state transition indicating a permit, limited-permit, hold, deny, remediation, review, escrow, suspended, challenged, expired, or reauthorize-required posture. The architecture supports post-authorization change management, derivative-lineage-aware invalidation, offline verification, portable release capsules, local reliance by downstream systems, and constrained fallback execution within current authorization boundaries.

30 Claims, 12 Drawing Sheets

(56) References Cited

U.S. PATENT DOCUMENTS

| | | | |
|---|---|---|---|
| 2015/0186962 | A1 | 7/2015 | Krell |
| 2016/0210621 | A1 | 7/2016 | Khan |
| 2017/0046716 | A1 | 2/2017 | Sheehan et al. |
| 2017/0075938 | A1 | 3/2017 | Black et al. |
| 2017/0359184 | A1 | 12/2017 | Camenisch et al. |
| 2019/0303579 | A1* | 10/2019 | Reddy .................. H04L 9/3239 |
| 2020/0259663 | A1 | 8/2020 | Firsov |
| 2022/0005047 | A1 | 1/2022 | Maheshwari et al. |
| 2024/0022433 | A1 | 1/2024 | Asor et al. |
| 2024/0195629 | A1 | 6/2024 | Hanson et al. |
| 2024/0256629 | A1 | 8/2024 | Whitney et al. |

OTHER PUBLICATIONS

OFCOM(Office of Communications). Part 3 Guidance on highly effective age assurance. Apr. 24, 2025. (PDF, 26 pp.) London, UK.

Temoshok, D.; Abruzzi, C.; Choong, Y.-Y.; et al. NIST SP 800-63A-4: Identity Proofing and Enrollment. NIST, Jul. 2025.

Allen, T.; Mccoll, L.; Walters, K.; Lyon, M. Measurement of Age Assurance Technologies—Pt. 2. ICO/Ofcom report, UK, 2023.

COPPA Rule (16 CFR Part 312)—Final Rule Amendments / source notice—FTC / eCFR—Jan. 17, 2013.

Age Appropriate Design Code 2020—Explanatory Memorandum—UK Government—Jun. 11, 2020.

OpenID Connect for Identity Assurance 1.0—OpenID Foundation—Oct. 1, 2024.

Laurie, Ben; Langley, Adam; Kasper, Emilia. RFC 6962: Certificate Transparency. Internet Engineering Task Force (IETF). Jun. 2013.

Verifiable Credentials Data Model v2.0—W3C Recommendation—May 15, 2025.

Verifiable Credential Data Integrity 1.0 (Securing the Integrity of Verifiable Credential Data)—W3C Recommendation—May 15, 2025.

RFC 9162: Certificate Transparency Version 2.0—IETF (RFC)—Dec. 2021.

* cited by examiner

DRIFT, DEPENDENCY, AND REAUTHORIZATION

OFFLINE VERIFICATION AND RELIANCE

LIVE-SESSION AND BRANCH AUTHORIZATION

POLICY PROFILE COMPOSITION

PLATFORM ADAPTERS AND RELEASE CAPSULES

PROCUREMENT, AUDIT, AND COMPLIANCE EXPORT

EXECUTION-TIME RELEASE CONTROL PLANE USING VALIDATED DECISION RECEIPTS, THEN-CURRENT RELEASE STATE, AND FAIL-CLOSED ACTION CONTROL

CROSS-REFERENCE TO RELATED APPLICATIONS

Any domestic benefit claim or foreign priority claim for this application is made, if at all, in an application data sheet or other permitted submission in accordance with applicable rules.

No statement in this specification is intended to enlarge, limit, or substitute for any domestic benefit claim or foreign priority claim made in an application data sheet or other permitted submission.

The present disclosure describes a unified release-state control plane centered on execution-time concurrence between validated decision-receipt authorization and then-current release-state authorization, together with fail-closed execution, action-scoped state mutation, portable reliance, drift-aware invalidation, branch control, rights and entitlement binding, release capsules, derivative lineage, policy overlays, and related embodiments.

FIELD OF THE INVENTION

The disclosure relates to computer-implemented systems, methods, and non-transitory machine-readable media that govern machine-executed release-related actions for digital asset packages.

More particularly, the disclosure relates to validated machine-readable decision receipts, then-current release-state services, package-continuity validation, action-scoped state mutation, and fail-closed execution interlocks that determine whether packaging, publication, distribution, rendering, recommendation, monetization, branch activation, or other release-related actions may occur.

Definitions and Common Inventive Concept

As used herein, a "decision receipt" may also be referred to as an authorization object, signed release credential, signed permit, or approval record.

As used herein, a "release-state registry" may also be implemented as or include a status service, control ledger, state store, or signed-state service.

As used herein, a "release gate" may also be referred to as an interlock, enforcement point, stateful controller, or execution guard.

As used herein, a "digital asset package" includes a digital asset and any associated package component that is required, optional, replaceable, or scope-specific for a requested release-related action. Illustrative package components include disclosures, warnings, provenance objects, attribution objects, accessibility objects, rights objects, entitlement objects, policy-composition objects, labels, thumbnails, captions, transcripts, metadata payloads, session-state bindings, geographic restrictions, or other machine-readable companions.

In some embodiments, a digital asset package is one example of a controlled-operation package. A controlled-operation package may additionally or alternatively comprise a tool-invocation package, API-request package, model-output package, workflow-transition package, connector action package, session-control package, or another machine-readable package whose execution, release, activation, transmission, or downstream reliance is conditioned on concurrence between a decision receipt and a then-current release state.

As used herein, "package continuity" and "continuity data" are broad terms. They may include exact cryptographic digests, canonicalized digests, segmented digests, Merkle roots, content-defined chunk digests, perceptual fingerprints, signed identifiers, stable transformation descriptors, or other integrity references sufficient to determine whether a presented package remains within an authorized continuity envelope for a requested action.

As used herein, a "release-related action" includes any machine-executed action by which a digital asset package is prepared, published, transmitted, rendered, displayed, streamed, recommended, amplified, syndicated, monetized, licensed, exported, ingested by a platform, activated in a live or interactive session, made available to an OEM device, or otherwise advanced to a downstream state with real-world effect.

As used herein, "validity-condition fields" identify machine-verifiable conditions that are required for a requested release-related action and may include one or more of freshness-clear conditions, challenge-clear conditions, trust-boundary-satisfied conditions, required-overlay-present conditions, required-companion-component-present conditions, state-not-expired conditions, derivative-lineage-consistent conditions, and reliance-scope-match conditions.

As used herein, a decision receipt may include an issuance-time or recorded decision-state field that reflects posture at issuance or recording time. Unless expressly stated otherwise, runtime authorization for a requested release-related action is determined from a then-current release state corresponding to the requested release-related action rather than solely from the issuance-time or recorded decision-state field.

In a common inventive concept that runs through the embodiments disclosed herein, a requested release-related action is not permitted merely because upstream evaluation produced a favorable outcome, and it is not permitted merely because a current state service indicates a favorable status in the abstract. Instead, the requested release-related action is permitted when a presented decision receipt validates for the requested action and a then-current release state concurrently authorizes that requested action.

The common inventive concept also includes fail-closed behavior and action-scoped state mutation. When the receipt does not validate, when the release state is not authorizing, when continuity is broken, when freshness conditions are not satisfied, or when required companion components or overlays are missing, the requested action is prevented, constrained, rerouted, or moved into a review or reauthorize-required posture, and a corresponding action-scoped transition record may be written or updated in a release-state registry or equivalent state-maintenance structure.

BACKGROUND

Existing digital-asset release workflows often rely on static approvals, historical log entries, or issuance-time credentials that do not reflect then-current authorization posture at execution time.

Such approaches can fail to preserve action-specific package continuity, required companion components, policy overlays, freshness limits, or current restrictions when downstream release-related actions are requested after an approval was first issued.

Existing approaches also struggle with post-issuance change management. A receipt or approval issued at one time may become unreliable after a rights update, policy overlay change, territory change, package modification, model update, cohort update, platform requirement change, or challenge event. Static approvals do not provide a robust, machine-enforced mechanism for stopping or rerouting later release actions in response to such changes.

In addition, relying parties such as platforms, OEMs, publishers, insurers, agencies, auditors, and procurement teams often need portable proof that a release decision remains valid at the moment of use. Those relying parties may need verification outputs, explanation fields, and compliance artifacts without gaining access to proprietary upstream model internals or confidential business logic.

There remains a need for a technical control plane that interlocks downstream execution with validated decision-receipt authorization and then-current, machine-verifiable release-state authorization; preserves action-specific package continuity; supports post-issuance invalidation and reauthorization; and allows portable reliance across trust domains.

The present disclosure addresses these and other technical problems.

SUMMARY OF THE INVENTION

The present disclosure provides computer-implemented control planes, systems, methods, and non-transitory machine-readable media that condition a requested release-related action for a digital asset package on execution-time concurrence between (i) validated machine-readable decision-receipt authorization for the requested release-related action and (ii) then-current release-state authorization for that requested release-related action.

A machine-readable decision receipt associated with the digital asset package may bind together package continuity data, policy continuity data, an action scope, a release-state reference, one or more validity conditions, and, in some embodiments, one or more evidence digests, rights references, lineage references, external-attestation references, or an issuance-time decision-state field that remains distinct from runtime authorization state.

A release gate may validate the machine-readable decision receipt by verifying authenticity, including signature validity where the machine-readable decision receipt is signed, schema conformance, package continuity, action-scope continuity, policy continuity, action-specific companion-component continuity, and satisfaction of the validity conditions.

The release gate may obtain, using the release-state reference or an equivalent lookup key, a then-current release state corresponding to the digital asset package and the requested release-related action, the then-current release state comprising a signed state object that includes freshness metadata or machine-readable state data resolved from the signed state object.

The requested release-related action may be permitted only when the machine-readable decision receipt validates and the then-current release state authorizes that requested release-related action. Otherwise, the requested release-related action may be prevented, constrained, downgraded, or rerouted in a fail-closed manner, and one or more reason codes may be output.

The control plane may support scope-specific states and action-scoped transition records, such that packaging may be permitted while monetization is held, publication may be permitted while recommendation amplification is denied, one territory or device path may be allowed while another path is blocked, and each resulting posture may be recorded in a release-state registry or equivalent state-maintenance structure.

Change events including rights changes, policy changes, model changes, cohort changes, disclosure changes, package changes, trust-boundary changes, derivative changes, or external challenge events may cause affected receipts or state entries to become stale, challenged, suspended, escrowed, or reauthorize-required, with affected subsets identified through dependency-graph, rollback-domain, or derivative-lineage relationships.

An offline verifier may validate a machine-readable decision receipt and a corresponding then-current release state without requiring access to proprietary model internals and may produce a signed verification bundle that is usable by a relying system in another trust domain according to a reliance scope, a view profile, a time basis, a freshness basis, and, in some embodiments, a second-layer attestation.

The control plane may further support platform adapters, OEM reliance objects, release capsules, derivative-lineage tracking, live branch authorization, rights and royalty binding, human review routes, procurement evidence export, and machine-readable audit packages while remaining anchored to the same common inventive concept of validated decision-receipt authorization, then-current release-state authorization, and fail-closed execution.

Additional embodiments and advantages will be apparent from the detailed description below.

DETAILED DESCRIPTION OF THE INVENTION

Figure 1:
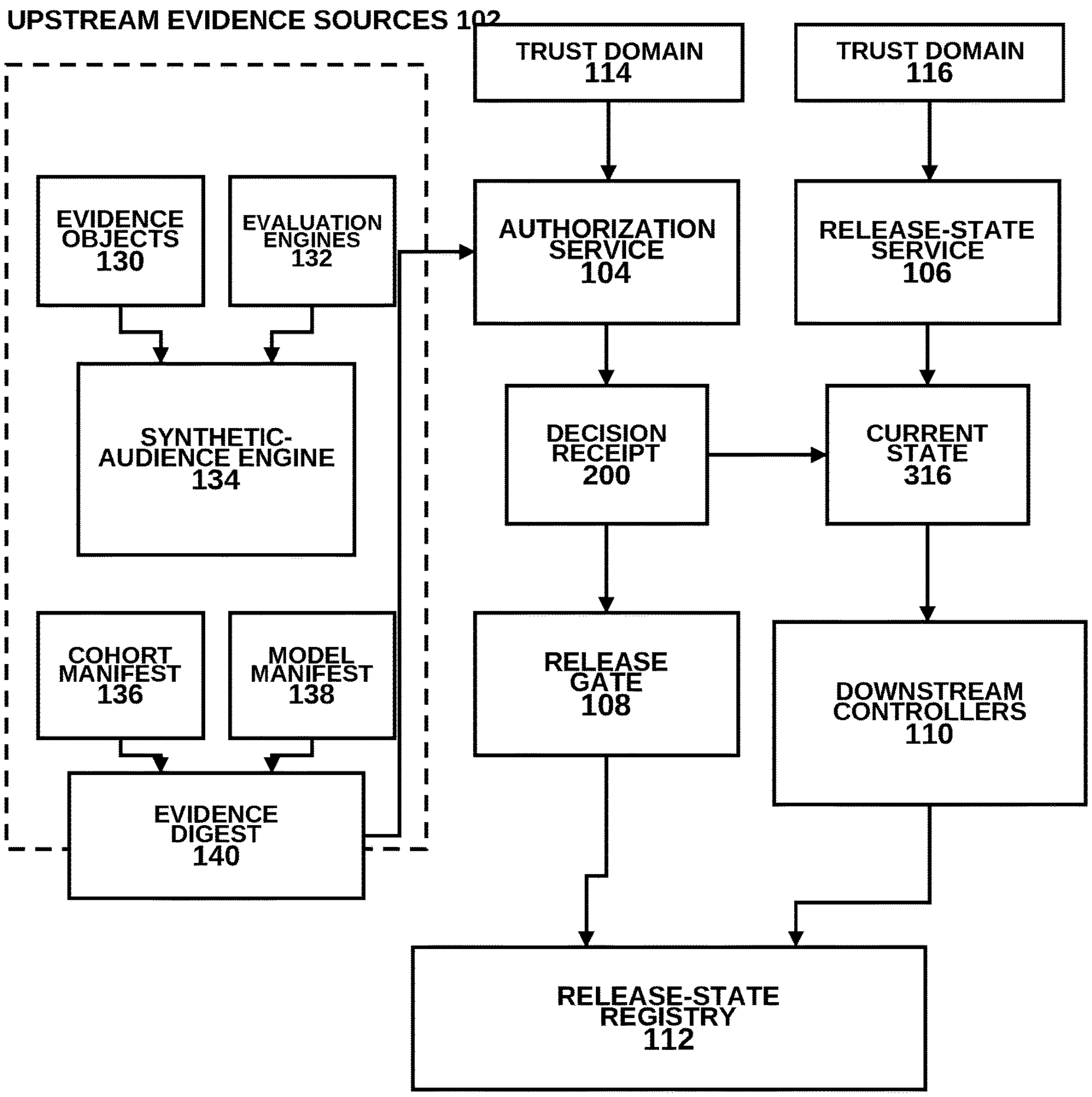
FIG. 1 is a diagram of an illustrative release-state control plane including an upstream evidence subsystem, a decision-receipt service, a release-state service, a release gate, and one or more downstream controllers.

The following description provides examples and illustrative embodiments. Functional blocks are exemplary rather than limiting. A person of ordinary skill in the art will understand that modules may be combined, subdivided, reordered, distributed, virtualized, or omitted while still practicing the disclosed common inventive concept.

A. Common Inventive Concept and Technical Effect

In some embodiments, the disclosed architecture improves operation of distributed computer authorization and execution control by preventing a downstream controller 110 from acting solely on stale approval metadata, a historical log entry, or a bare signed object. Instead, the downstream controller 110 is interlocked to a current, machine-verifiable combination of decision-receipt validity and then-current release state 316 for the requested action at execution time.

In some embodiments, this architecture improves reliability by requiring action-specific validation of the digital asset package 500 that is actually presented, including required companion components 504 and required overlays 904, rather than relying on a generic approval disconnected from the runtime package.

In some embodiments, the architecture improves post-issuance control because the then-current release state 316 can be updated independently of the decision receipt 200 when drift, challenge, rights changes, disclosure changes, policy changes, or derivative-lineage changes occur. The architecture therefore permits rapid invalidation, suspension, limited-permitting, or review routing without rewriting every downstream system 110.

In some embodiments, the architecture improves portability because a relying party can validate a decision receipt 200, a corresponding then-current release state 316, or a signed verification bundle 704 without accessing proprietary evaluation engines, thereby supporting cross-organizational reliance while preserving confidential internals and still retaining action-scoped state mutation 330 and reason-code visibility 322.

B. System Architecture and Enforcement Points

Referring to FIG. 1, an illustrative release-state control plane 100 includes one or more upstream evidence sources 102, an authorization service 104 that creates or maintains decision receipts, a release-state service 106 that maintains current action-scoped state, a release gate 108 that performs validation and concurrence checks, one or more downstream controllers 110 that execute or refrain from executing requested actions, and, in some embodiments, a release-state registry 112 or equivalent state-maintenance structure.

In some embodiments, the downstream controller 110 is implemented within a content-management system, publication service, ad server, player, recommendation engine, CDN, marketplace, OEM firmware element, application runtime, game engine, chatbot gateway, model-serving proxy, or other execution environment.

In some embodiments, the release gate 108 is invoked synchronously at the moment of action. In other embodiments, the release gate 108 precomputes permit tokens subject to freshness limits and still prevents final execution when a freshness check, challenge check, companion-component check, or then-current-state check fails at execution time.

In some embodiments, the release gate 108 and the release-state service 106 are operated by the same organization. In other embodiments, the release gate 108 and the release-state service 106 are operated by different trust domains 114, 116 under a federated or delegated arrangement, provided that the release gate 108 can determine whether the then-current state authorizes the requested action and can record or cause recording of the resulting action-scoped transition posture in the release-state registry 112, an append-only record, or an equivalent state-maintenance structure.

C. Digital Asset Packages and Package Continuity

Figure 5:
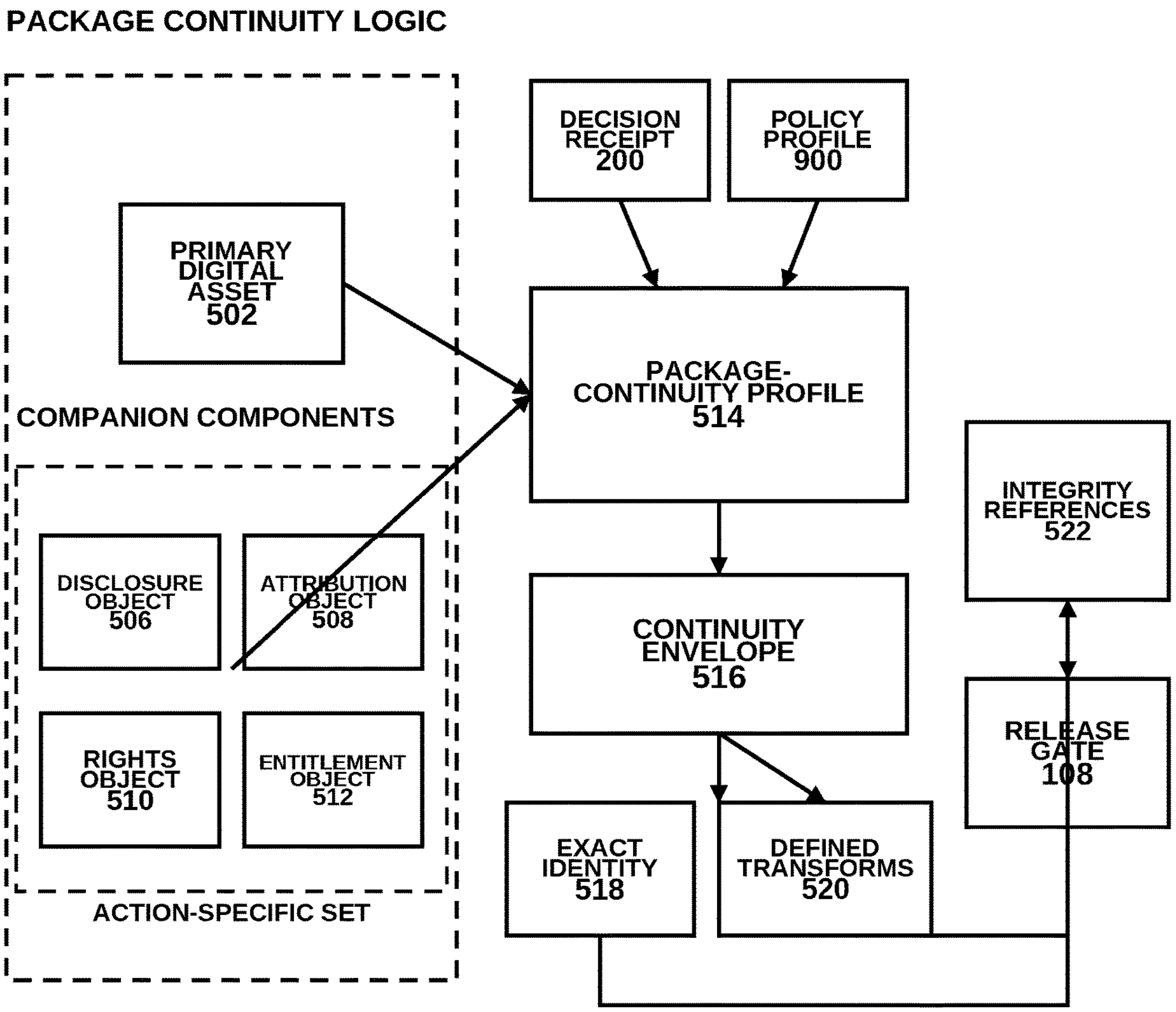
FIG. 5 is a diagram of illustrative package-continuity logic for primary assets and companion components with action-specific continuity requirements.

Referring to FIG. 5, a digital asset package 500 may include a primary digital asset 502 and one or more companion components 504. The set of relevant companion components 504 may depend on the requested action. For example, a publication action may require a disclosure object 506 and an attribution object 508, while a monetization action may additionally require a rights object 510 and an entitlement object 512.

In some embodiments, a package-continuity profile 514 identifies which component classes are mandatory, optional, replaceable, time-bounded, territory-bounded, channel-bounded, or substitution-restricted for a given action scope. Different requested actions may therefore require different companion-component sets 504.

In some embodiments, a continuity envelope 516 is satisfied by exact identity 518. In other embodiments, the continuity envelope 516 allows defined transformations 520 such as re-encoding, resizing, container changes, watermarking, label insertion, accessibility augmentation, or other approved transformations that preserve authorized continuity according to the package-continuity profile 514.

In some embodiments, the release gate 108 checks continuity for the digital asset package 500 using one or more cryptographic digests, segmented digests, Merkle proofs, canonicalized digests, perceptual fingerprints, or signed identifiers 522. Multiple continuity techniques may be used together for different package components 504.

In some embodiments, omission, corruption, or unauthorized substitution of a required companion component 504 causes the requested action to fail closed, move to limited-permit, hold, or reauthorize-required until a compliant package 500 or replacement authorization path is established.

D. Upstream Evidence Objects and Evaluation Engines

In some embodiments, the decision receipt 200 is supported by one or more upstream evidence objects 130. Illustrative evidence objects 130 include provenance data, rights data, license data, consent data, disclosure data, accessibility data, safety-review data, moderation data, package-continuity data, platform-conformance data, and policy-composition data.

In some embodiments, one or more evaluation engines 132 transform the upstream evidence objects 130 into an evidence digest 140, recommendation, confidence indicator, risk vector, or machine-readable result used when issuing or updating a decision receipt 200.

In some embodiments, at least one evaluation engine 132 is a synthetic-audience engine 134 that processes candidate assets or variants with one or more cohort manifests 136 and model manifests 138 to generate predicted reaction, comprehension, comfort, engagement, confusion, disclosure-effect, or conversion-related outputs.

In some embodiments, a policy profile 900 evaluates those outputs with other evidence objects 130 to determine whether a candidate package 500 may receive a permit-capable receipt 200, a limited-permit receipt 200, a hold result, or a deny result. Synthetic-audience evidence is optional, is not required for practice of the common inventive concept disclosed herein, and is not required in all embodiments.

In some embodiments, the upstream evidence subsystem 102 also records lineage for evidence sources 130, versions, timestamps, or trust boundaries 114, 116 so that later drift or challenge events can identify affected authorization paths.

E. Decision Receipts and Authorization Objects

Figure 2:
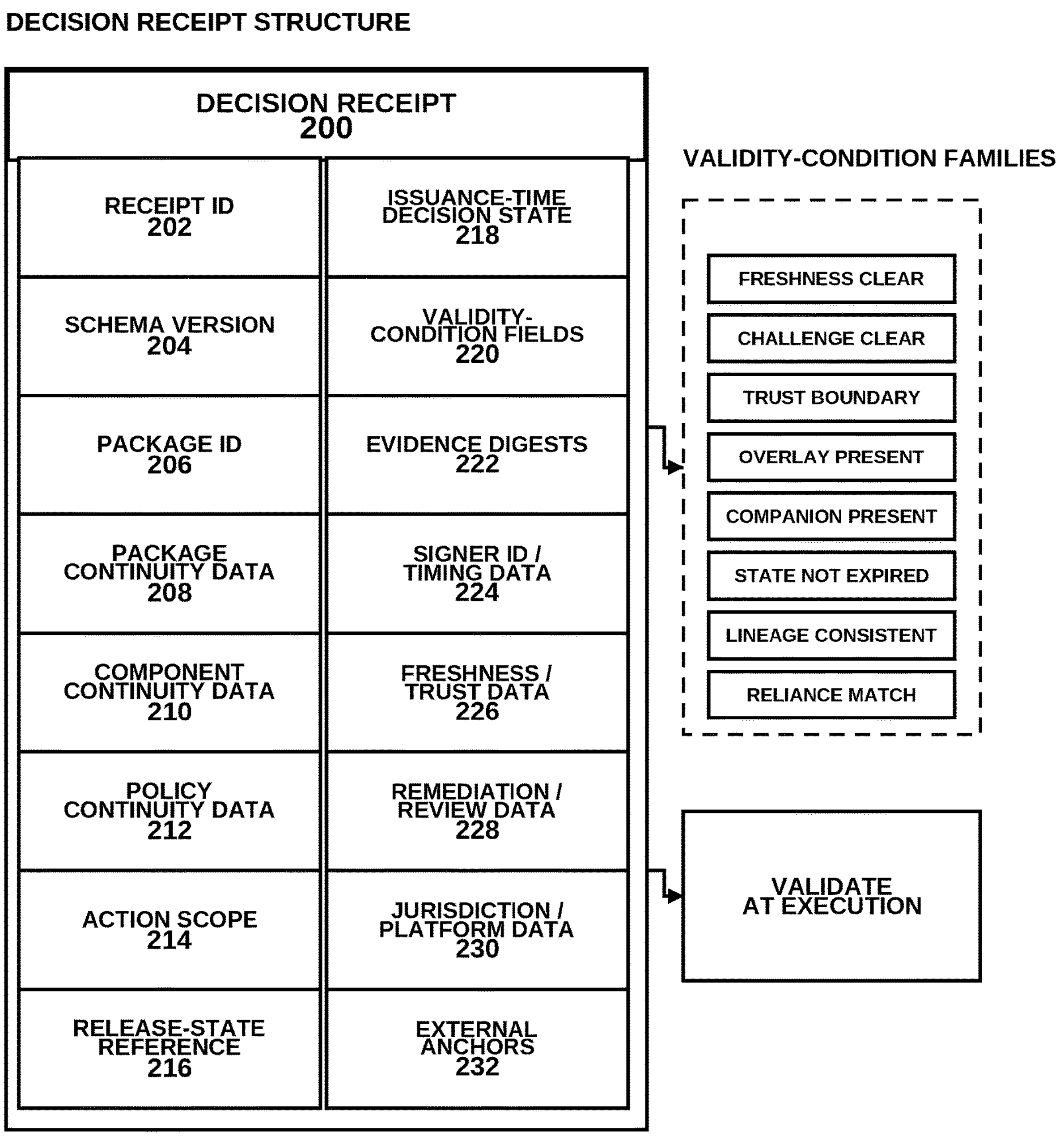
FIG. 2 is a diagram of an illustrative decision receipt and related authorization-object fields, including validity-condition families and an optional issuance-time decision-state field.

Referring to FIG. 2, a decision receipt 200 may include a receipt identifier 202, schema version 204, package identifier 206, package continuity data 208, component continuity data 210, policy continuity data 212, an action-scope field 214, a release-state reference 216, an optional issuance-time or recorded decision-state field 218, one or more validity-condition fields 220, and one or more evidence digests 222.

In some embodiments, the decision receipt 200 further includes signer identity and timing data 224, freshness and trust data 226, remediation and review data 228, jurisdiction, device, platform, and reliance-scope data 230, and one or more external-anchor references 232.

In some embodiments, the one or more validity-condition fields 220 are organized into exemplar families such as freshness-clear, challenge-clear, trust-boundary-satisfied, required-overlay-present, required-companion-component-present, state-not-expired, derivative-lineage-consistent, and reliance-scope-match. Different requested actions may rely on different subsets of those families.

In some embodiments, the action-scope field 214 specifies one or more authorized actions such as packaging, publication, transmission, rendering, streaming, recommendation, ranking amplification, monetization, licensing, export, API serving, branch activation, session-state activation, territory switching, or continued circulation.

In some embodiments, one decision receipt 200 may authorize multiple actions, while in other embodiments separate decision receipts 200 are used for separate actions, channels, territories, platforms, account types, session states, derivative paths, or reliance scopes.

In some embodiments, the decision receipt 200 is signed by a hardware-protected key, trusted execution environment, quorum witness service, certificate-backed signer, threshold signer, or other trustworthy signing arrangement 224. In some embodiments, issuance also records an anchor 232 in a transparency log, trust list, append-only ledger, notary service, or comparable external verification structure.

F. Release-State Service, Signed State Objects, and Fail-Closed Release Gate

Figure 3:
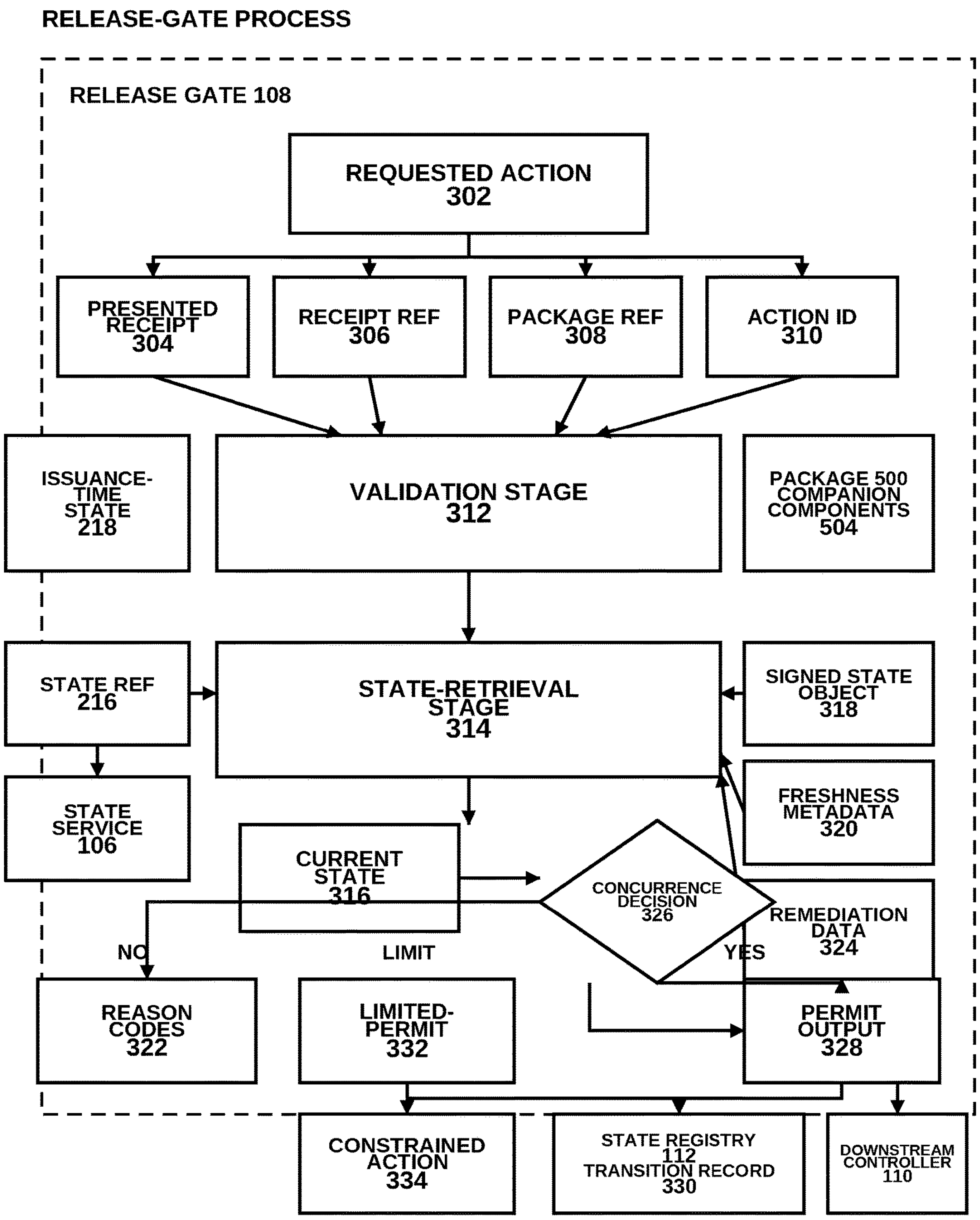
FIG. 3 is a flow diagram of an illustrative release-gate process for validating a presented package, obtaining a then-current release state, determining a release-transition outcome, and recording an action-scoped state transition.

Referring to FIG. 3, a release-gate process 300 receives or detects a requested release-related action 302 for a digital asset package 500. The request may include a presented decision receipt 304, a receipt reference 306, a package reference 308, an action identifier 310, or a combination thereof.

In some embodiments, the release gate 108 performs a validation stage 312 that checks the decision receipt 304 for authenticity, including signature validity where the decision receipt 304 is signed, schema conformance, action-scope continuity, package continuity, policy continuity, validity conditions, required companion components 504, and, where relevant, external-anchor or trust-boundary conditions.

In some embodiments, the release gate 108 then performs a state-retrieval stage 314 to obtain a then-current release state 316 from the release-state service 106 using the release-state reference 216 or an equivalent lookup key derived from the package 500 and the requested action 302. The release-state service 106 may return a state value, a signed state object 318, freshness metadata 320, reason codes 322, remediation data 324, or combinations thereof, and cached or delegated state may be relied upon only within a configured freshness policy for the requested action 302.

In some embodiments, a concurrence decision stage 326 requires both decision-receipt validity and then-current release state 316. A valid decision receipt 304 alone is insufficient. A current state of permit alone is insufficient. An issuance-time or recorded decision-state field 218 within the decision receipt 304 is likewise insufficient by itself. The downstream controller 110 acts only when both receipt validation and then-current state 316 authorize the requested action 302.

In some embodiments, when a permit output 328 is not obtained, the release gate 108 prevents the action, emits reason codes 322, and optionally returns remediation instructions, a review route, a fallback path, or a request for reauthorization. Responsive to an outcome 328 selected from permit, limited-permit, hold, deny, expired, challenged, suspended, escrow, remediation, review, and reauthorize-required, the release gate 108 may record or cause recording of a corresponding action-scoped transition record 330 in the release-state registry 112, a state store, an append-only record, a cache-backed responder, or an equivalent state-maintenance structure.

In some embodiments, the release gate 108 may also return a limited-permit outcome 332 that authorizes a constrained action 334 rather than the originally requested action 302, such as distribution with additional labeling, a reduced territory set, a neutral branch, a restricted recommendation posture, a sandbox environment, or an alternate monetization path that remains within current authorization boundaries.

G. State Model, Reason Codes, and Constrained Outcomes

Figure 4:
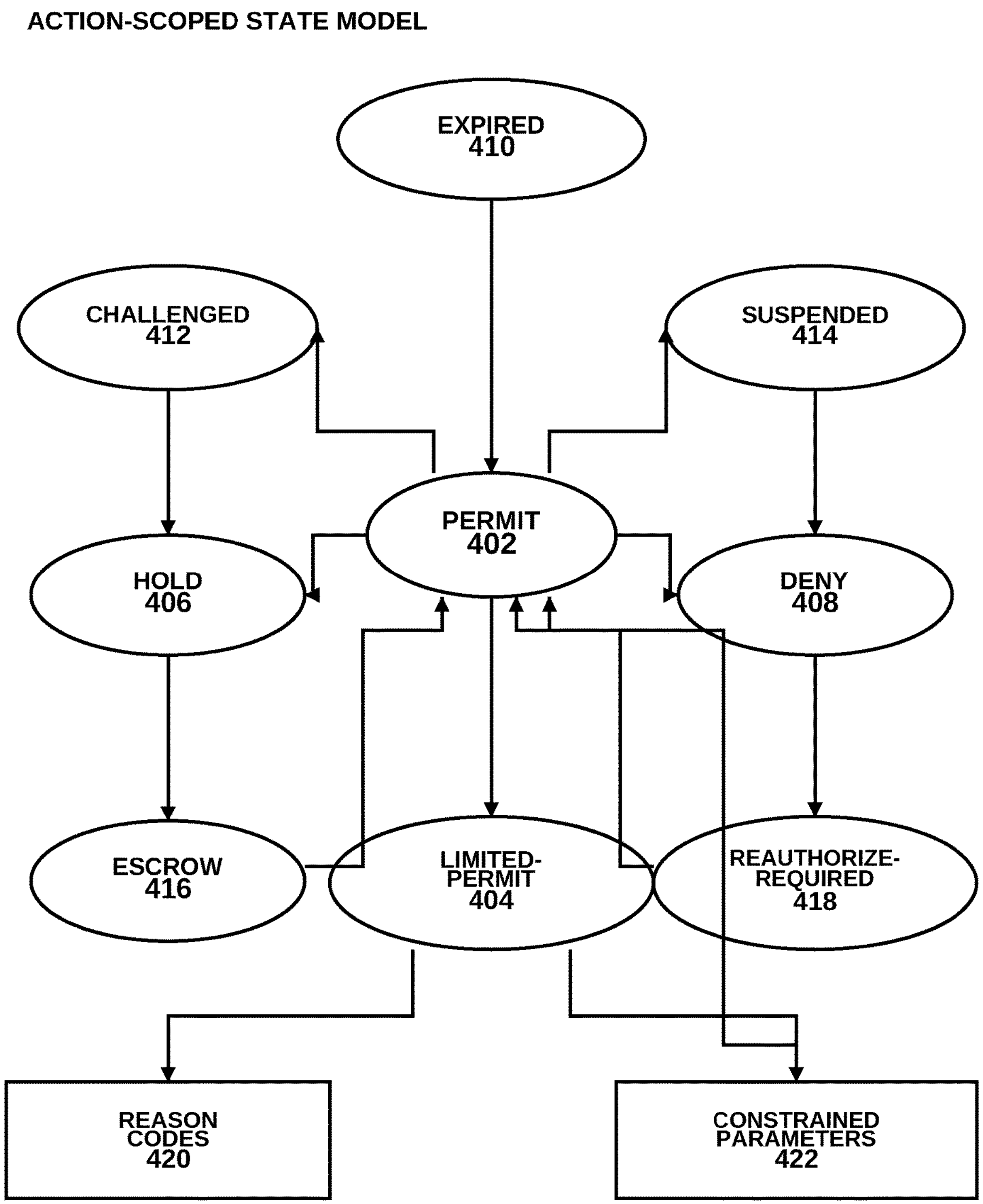
FIG. 4 is a state diagram of illustrative permit, limited-permit, hold, deny, expired, challenged, suspended, escrow, and reauthorize-required states and transitions among them.

Referring to FIG. 4, an illustrative state model 400 includes permit state 402, limited-permit state 404, hold state 406, deny state 408, expired state 410, challenged state 412, suspended state 414, escrow state 416, and reauthorize-required state 418. Additional states may also be used.

In some embodiments, each state in the state model 400 is action scoped. A package 500 may be in permit state 402 for packaging, limited-permit state 404 for publication, hold state 406 for recommendation amplification, and deny state 408 for monetization, all at the same time, depending on the affected evidence, policy, rights, or platform conditions.

In some embodiments, reason codes 420 identify which condition caused a non-permit outcome. Illustrative reason-code classes include signature failure, schema mismatch, continuity breach, missing companion component, stale policy digest, expired authorization, freshness failure, external challenge, rights deficiency, territory mismatch, platform mismatch, trust-boundary failure, derivative-lineage mismatch, reliance-scope mismatch, or review-required status.

In some embodiments, constrained outcome parameters 422 are machine readable. A limited-permit state 404 may specify allowed channels, required labels, geographic restrictions, display restrictions, ranking restrictions, fallback branches, or entitlement-routing conditions that a downstream controller 110 must enforce in order to proceed.

Figure 6:
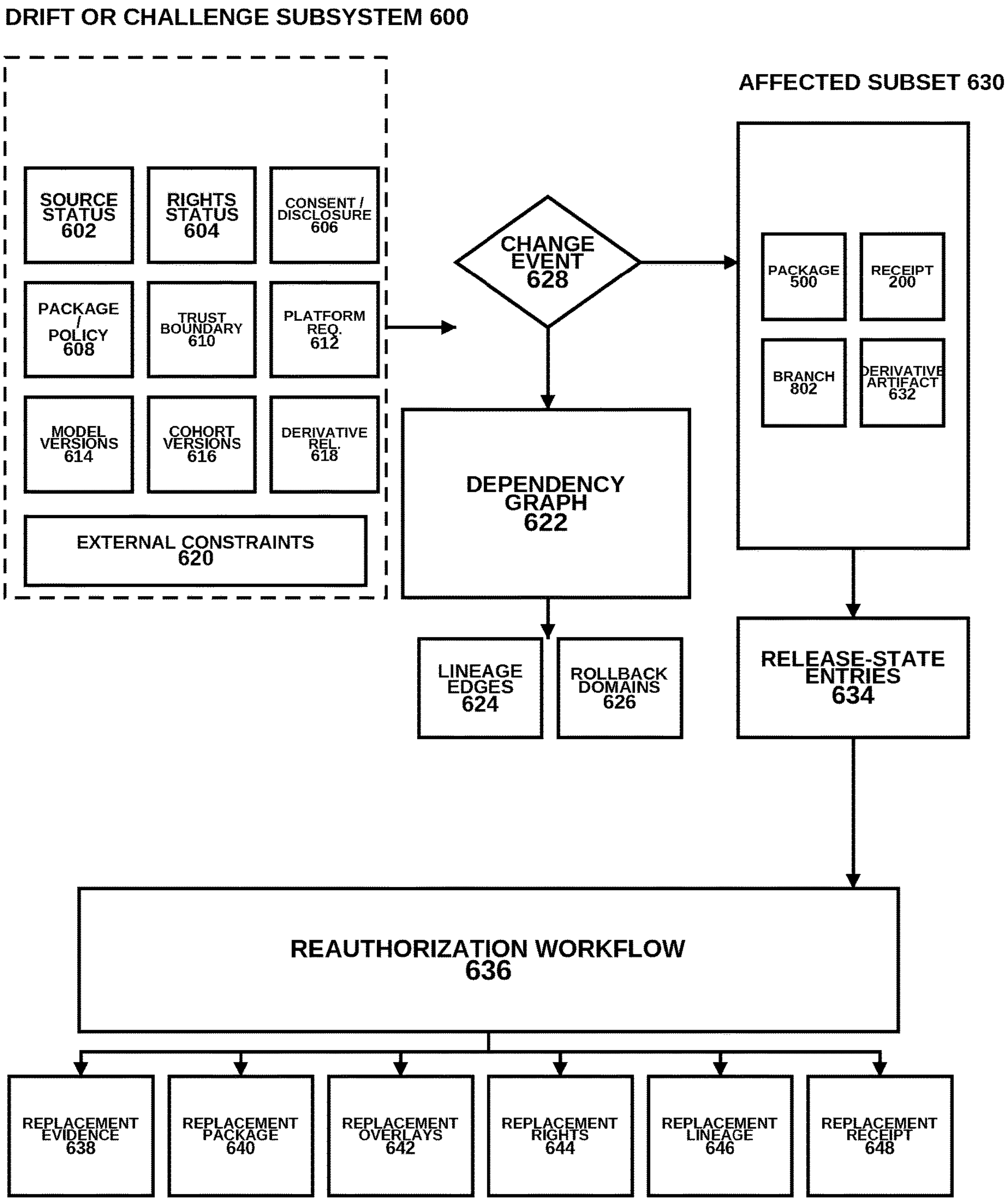
FIG. 6 is a diagram of illustrative drift, change-management, dependency-graph, rollback-domain, derivative-lineage, and reauthorization flows.

H. Drift, Dependency Graphs, Rollback Domains, Derivative Lineage, and Reauthorization Referring to FIG. 6, a drift or challenge subsystem 600 may detect changes in source status 602, rights status 604, consent or disclosure status 606, package or policy status 608, trust-boundary status 610, platform requirements 612, model versions 614, cohort versions 616, derivative relationships 618, or external legal or contractual constraints 620.

In some embodiments, a dependency graph 622 records machine-readable relationships among packages 500, decision receipts 200, evidence objects 130, policy profiles 900, rights objects 510, branches 802, derivative-lineage nodes 624, rollback domains 626, overlays 904, relying parties 1000, entitlement paths 1108, and settlement paths 1110. The dependency graph 622 allows the system to identify which authorization paths are affected by a detected change.

In some embodiments, rollback domains 626 partition packages 500 or authorization paths into logical groups such as shared rights families, shared branch families, shared disclosure families, shared model or cohort families, shared OEM deployments, or shared derivative families. A challenge affecting one rollback domain 626 need not force identical state changes for unrelated domains, even when the domains share some upstream evidence.

In some embodiments, when a change event 628 is detected, the system propagates the event through one or more dependency-graph edges of the dependency graph 622, derivative-lineage edges 624, and rollback-domain mappings 626 to calculate an affected subset 630 of packages 500, decision receipts 200, branches 802, derivative artifacts 632, channels, territories, relying parties 1000, entitlement paths 1108, or settlement paths 1110. Affected decision receipts 200 may then be marked stale, challenged, suspended, escrowed, or reauthorize-required, and corresponding release-state entries 634 may be updated before subsequent release actions can be permitted.

In some embodiments, previously issued decision receipts 200 remain available as evidence of what was authorized at an earlier time while becoming insufficient for future permit decisions. This preserves evidentiary continuity without allowing stale authorizations to drive new release actions and without erasing lineage to later challenge, rollback, or settlement decisions.

In some embodiments, a reauthorization workflow 636 generates replacement evidence 638, replacement packages 640, replacement overlays 642, replacement rights data 644, replacement derivative-lineage bindings 646, or replacement receipts 648 and restores permit or limited-permit status only for scopes that satisfy the updated conditions.

I. Offline Verification, Differential Views, and Signed Verification Bundles

Figure 7:
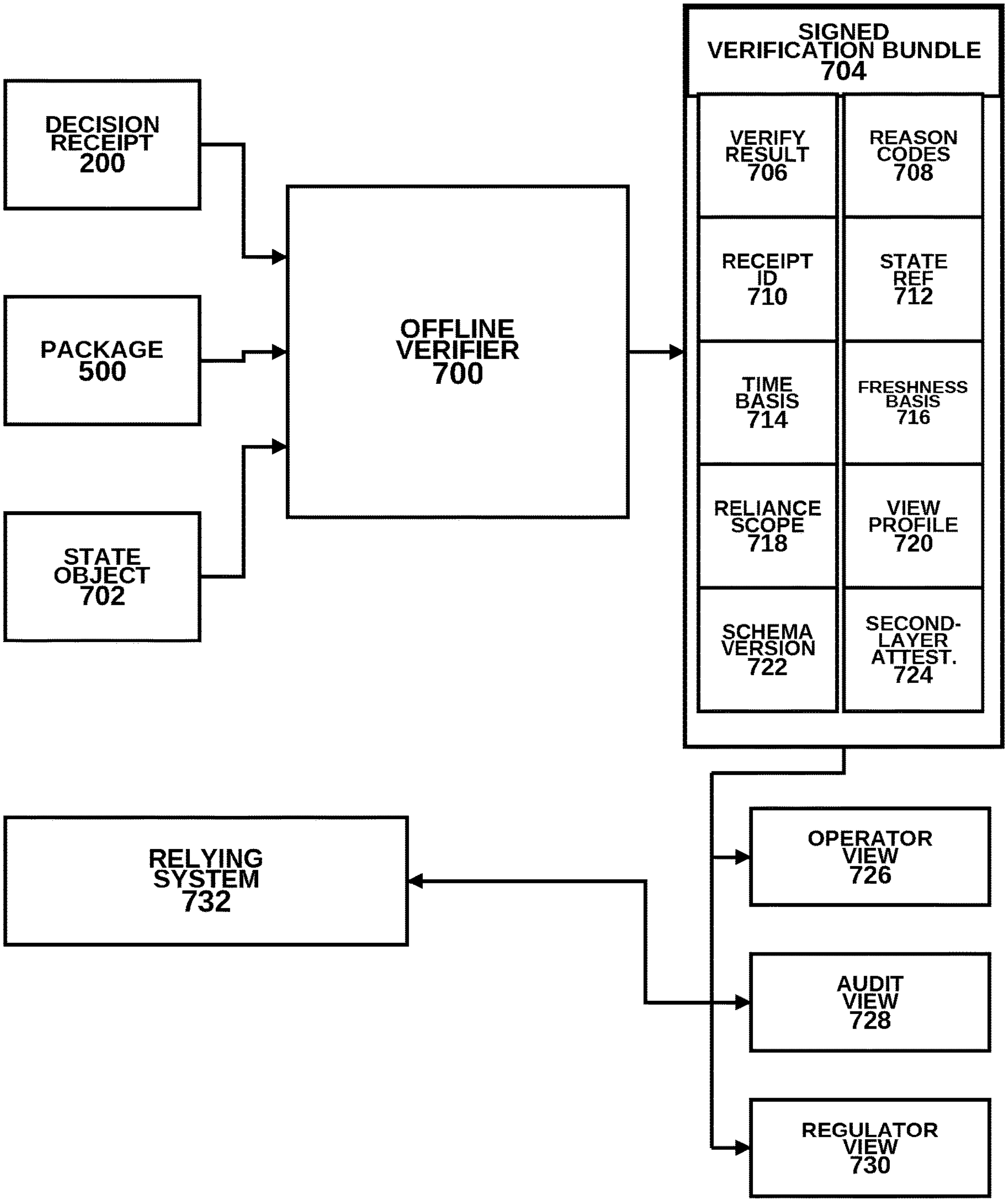
FIG. 7 is a diagram of illustrative offline verification, differential view generation, and signed verification-bundle creation with reliance-scope and freshness data.

Referring to FIG. 7, an offline verifier 700 may validate a decision receipt 200, a presented package 500, and a current or recently obtained release-state object 702 without requiring access to proprietary upstream model weights, prompt internals, or confidential evaluation code.

In some embodiments, the offline verifier 700 produces a signed verification bundle 704 that includes a verification result 706, one or more reason codes 708, a receipt identifier 710, a release-state reference 712, a time basis 714, a freshness basis 716, a reliance scope 718, a view-profile identifier 720, a schema version 722, and an optional second-layer attestation 724.

In some embodiments, different stakeholder views 726, 728, 730 are derived from the same underlying decision receipt 200 or signed verification bundle 704. A first view 726 may expose operational details. A second view 728 may emphasize audit lineage. A third view 730 may expose only limited public-facing or regulator-facing fields while preserving verifiability of the shared underlying authorization state and the same underlying release-transition result.

In some embodiments, a relying system 732 accepts a remote signed verification bundle 704 only after validating its signature, freshness, schema, view scope, reliance scope, and, where present, second-layer attestation 724. A platform, OEM, insurer, auditor, customer, or procurement reviewer may treat the signed verification bundle 704 as sufficient for a local permit, hold, deny, report, or review workflow according to configured reliance rules.

J. Platform Adapters, OEM Reliance, Release Capsules, and Derivative Lineage

Figure 10:
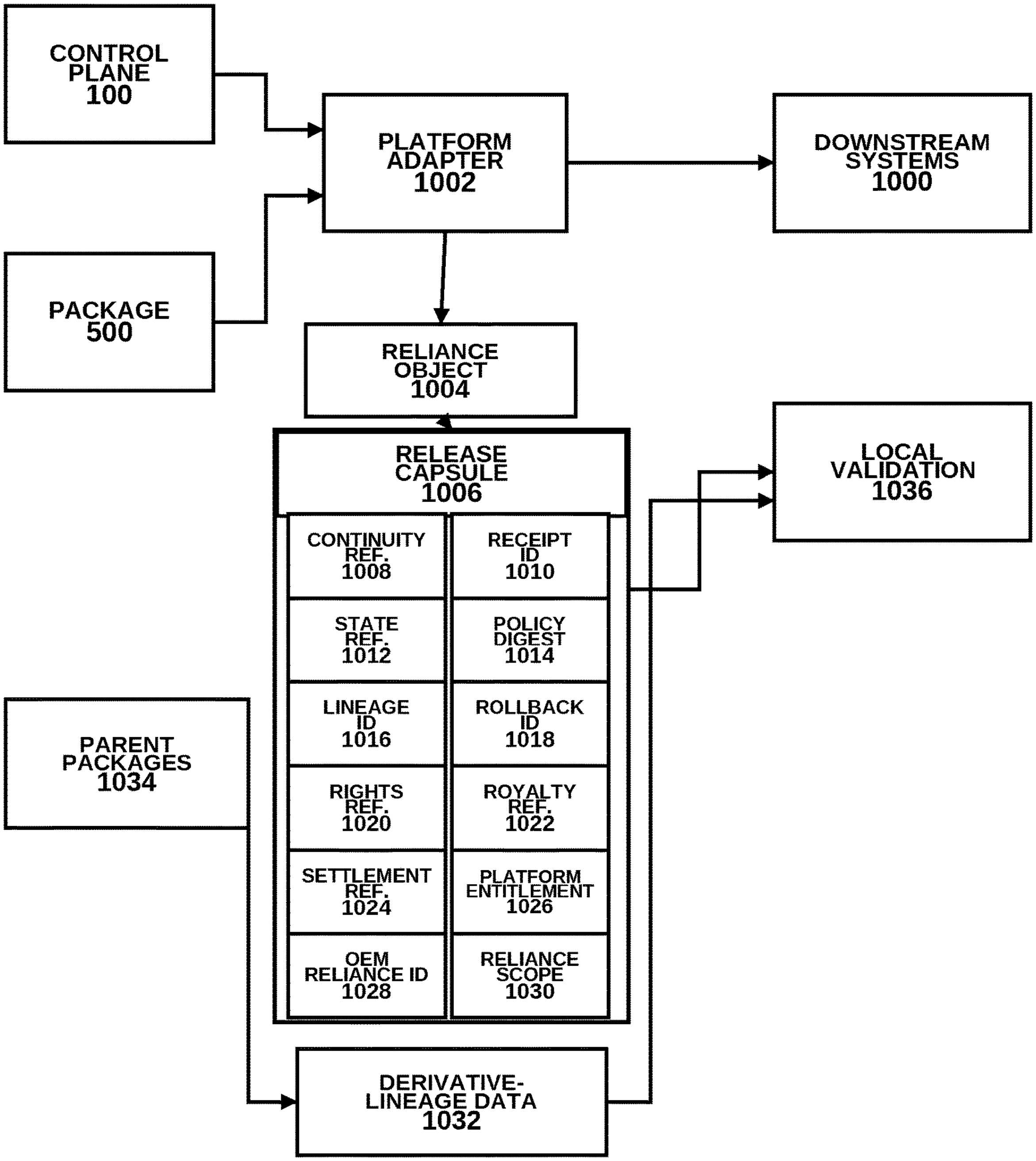
FIG. 10 is a diagram of illustrative platform adapters, OEM reliance paths, release capsules, and downstream local validation.

Referring to FIG. 10, the disclosed control plane 100 may interact with external platforms, publishers, OEMs, devices, app stores, browsers, CDNs, ad-tech systems, recommendation systems, moderation systems, and other downstream systems 1000 through one or more platform adapters 1002.

In some embodiments, a platform adapter 1002 converts internal authorization state into a downstream reliance object 1004 such as a release capsule 1006, signed manifest, verifiable credential, status proof, entitlement token, content-credentials-compatible object, or other portable control object.

In some embodiments, a release capsule 1006 binds a package identifier or continuity reference 1008, a receipt identifier 1010, a release-state reference 1012, and a policy-composition digest 1014, and may optionally bind a derivative-lineage identifier 1016, a rollback-domain identifier 1018, a rights reference 1020, a royalty reference 1022, a settlement reference 1024, a platform-entitlement reference 1026, an OEM reliance identifier 1028, or a reliance-scope indicator 1030.

In some embodiments, derivative-lineage data 1032 records how a derivative asset, branch, variant, thumbnail, caption, summary, or transformed package was produced from one or more parent assets or parent packages 1034. A downstream system 1000 may require that the derivative-lineage identifier 1016 bound in a release capsule 1006 remain consistent with the derivative package that is being used.

In some embodiments, local validation 1036 by a platform or OEM of the downstream systems 1000 can therefore fail closed when a derivative path 1032, package 500, channel, territory, device condition, or reliance scope falls outside the scope of the portable reliance object 1004, even if an upstream organization once approved a related but different asset family.

K. Live, Interactive, and Branch-Based Control

Figure 8:
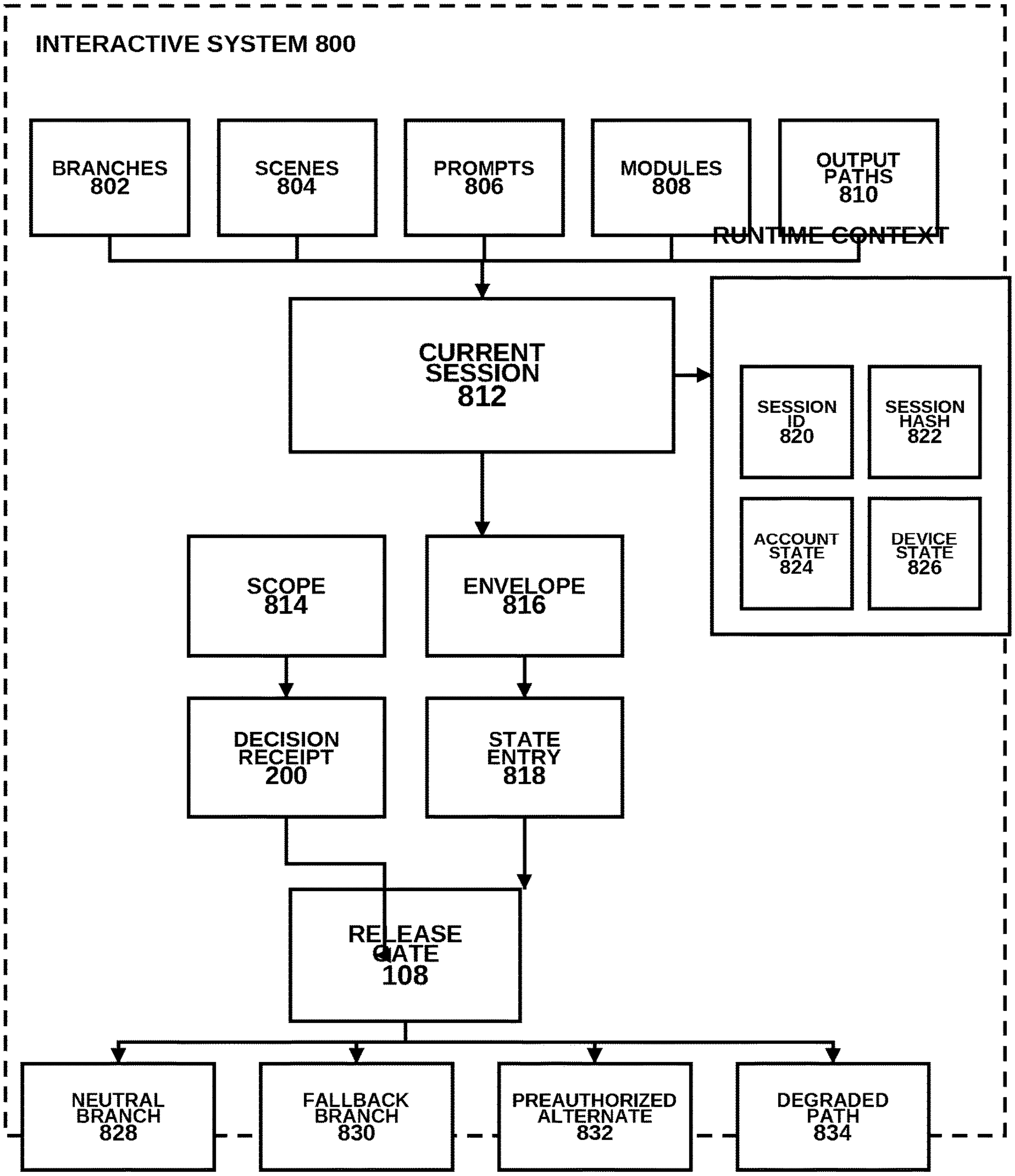
FIG. 8 is a diagram of illustrative live-session and branch-state authorization for interactive or adaptive content.

Referring to FIG. 8, the disclosed architecture may govern a live, adaptive, or interactive system 800 in which one or more branches 802, scenes 804, prompts 806, modules 808, or output paths 810 compete for activation in a current session 812.

In some embodiments, each branch 802 or branch family has its own decision receipt 200, scope 814, continuity envelope 816, and release-state entry 818. Before a branch 802 is activated, the release gate 108 validates the relevant decision receipt 200 and checks the current release state for the branch-activation scope.

In some embodiments, the relevant decision receipt 200 binds a session-state identifier 820, session-state hash 822, account state 824, device state 826, or other runtime context so that authorization is specific not only to the branch 802 but also to the current authorized session posture.

In some embodiments, when a requested branch 802 is not permitted, the system selects a neutral branch 828, fallback branch 830, preauthorized alternate branch 832, or degraded response path 834 whose associated authorization remains in permit or limited-permit state. This preserves fail-closed control without requiring the entire session 812 to terminate.

L. Policy Profiles, Overlays, and Contextual Composition

Figure 9:
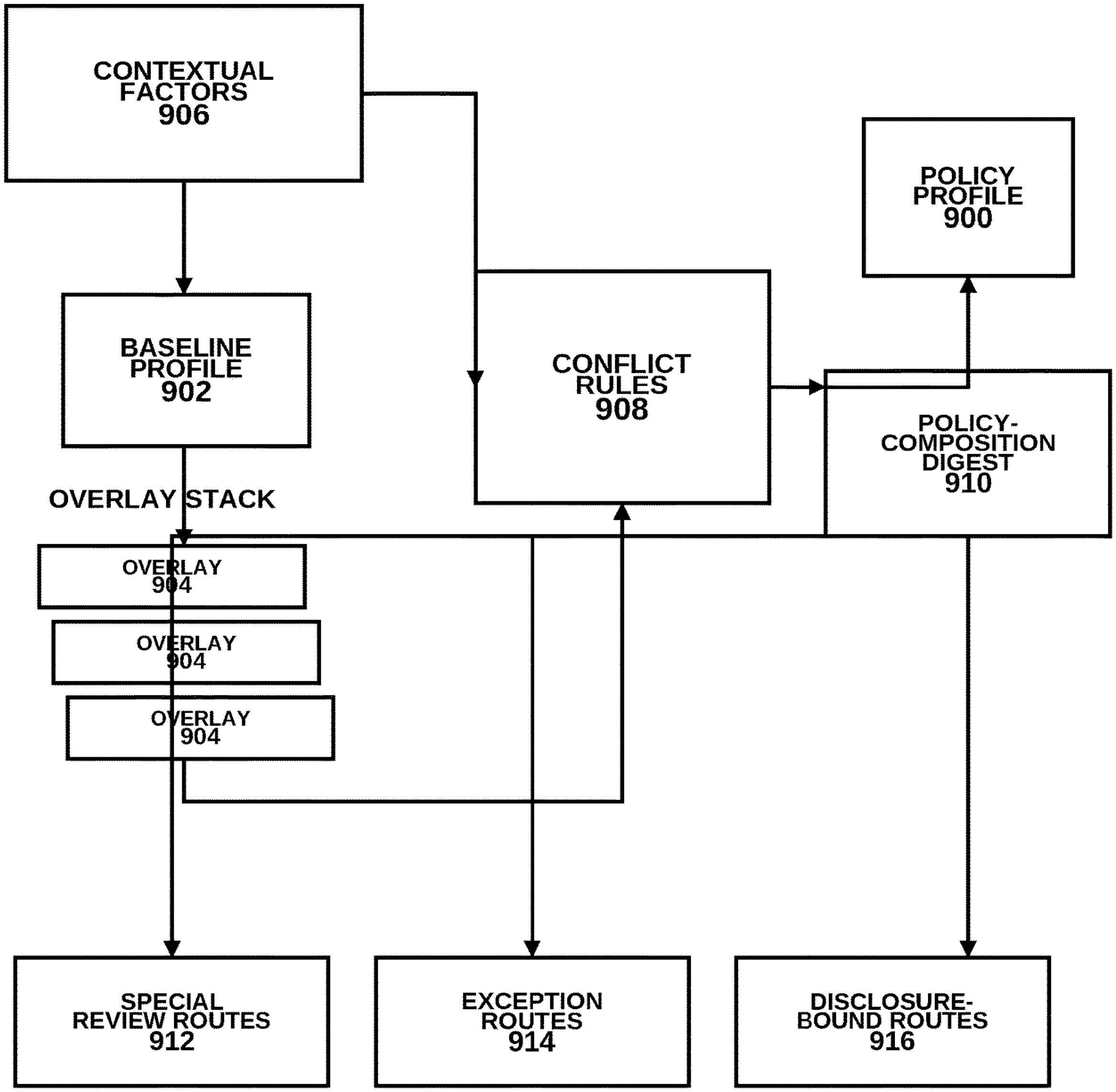
FIG. 9 is a diagram of illustrative policy-profile composition using a baseline profile and one or more overlays selected according to channel, territory, platform, account type, or risk posture.

Referring to FIG. 9, a policy profile 900 may be formed from a baseline profile 902 and one or more overlays 904 selected according to territory, channel, platform, account type, age tier, content class, risk tier, vertical, contractual context, or other contextual factors 906.

In some embodiments, policy continuity is not satisfied merely because the same baseline profile 902 remains present. Instead, required overlays 904, overlay order, overlay priorities, overlay exclusions, and overlay conflict rules 908 may also be checked at release time.

In some embodiments, a change to a required overlay 904 or to a policy-composition digest 910 causes a previously issued decision receipt 200 to become limited-permit, hold, deny, suspended, or reauthorize-required for one or more scopes even if the primary asset 502 itself remains unchanged.

In some embodiments, policy profiles 900 may encode special review routes 912, exception routes 914, or disclosure-bound routes 916 for sensitive categories such as public-interest communications, journalistic material, parody, documentary content, age-restricted channels, or legally mandated notices, thereby allowing the control plane 100 to route borderline cases to designated review states instead of forcing a simplistic binary outcome.

M. Rights, Royalties, Entitlements, and Settlement Routing

Figure 11:
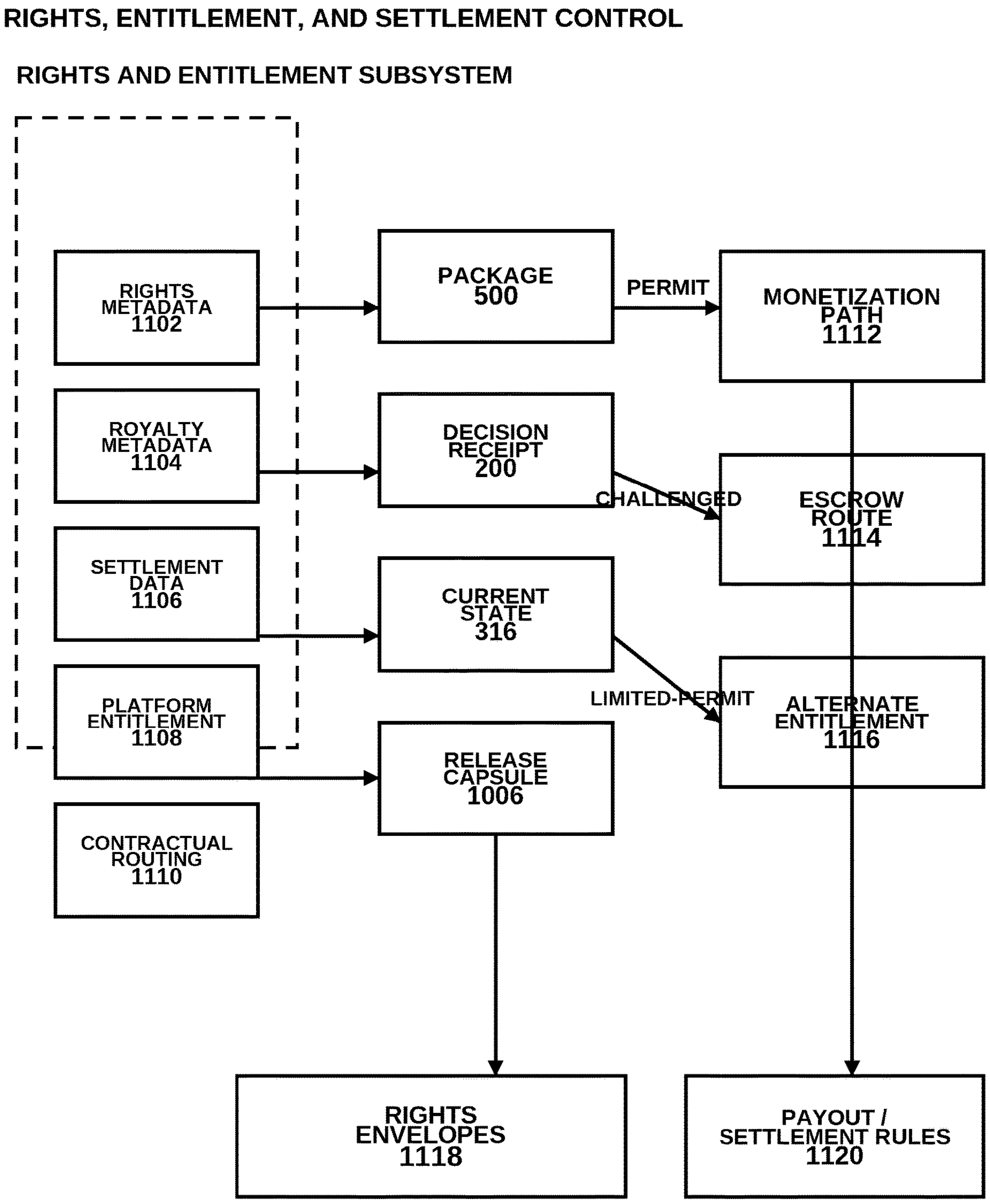
FIG. 11 is a diagram of illustrative rights, royalty, entitlement, and settlement control bound to release-state transitions.

Referring to FIG. 11, a rights and entitlement subsystem 1100 may bind rights metadata 1102, royalty metadata 1104, settlement data 1106, platform-entitlement data 1108, or contractual routing data 1110 to the package 500, decision receipt 200, then-current release state 316, or release capsule 1006.

In some embodiments, monetization, access, or settlement behavior follows the release-state transition itself. For example, a monetization path 1112 may activate only upon permit, shift to an escrow route 1114 upon challenge, suspend upon deny, or reroute to an alternate monetization or neutral entitlement rule 1116 under limited-permit.

In some embodiments, different channels, territories, platforms, or derivative paths are associated with different rights envelopes 1118 and different payout or settlement rules 1120, all tied back to the same action-scoped release-state architecture.

N. Security, Trust Anchors, Federation, and Freshness

In some embodiments, trust in the disclosed architecture is strengthened through hardware-backed keys, trusted execution environments, hardware security modules, certificate chains, trust lists, transparency logs, witness signatures, timestamp authorities, remote attestation, or combinations thereof.

In some embodiments, the release-state service returns a signed state object with freshness metadata so that a relying party can verify that the state is sufficiently current for the requested action. In some embodiments, cached state is allowed only within a configured freshness window, only for low-risk scopes, or only when the signed state object remains within a stated freshness policy.

In some embodiments, the architecture is federated. One trust domain may issue a receipt, another may maintain authoritative current state, and a third may rely on a signed verification bundle or release capsule, provided that the relying domain can validate signatures, freshness, and scope.

In some embodiments, the architecture uses application programming interfaces, machine-readable data formats, or interoperability adapters so that relying parties are not locked to a single vendor-specific enforcement surface while still preserving the same core requirement of receipt validation plus current-state concurrence.

O. Procurement, Audit, Explanation, and Compliance Operations

Figure 12:
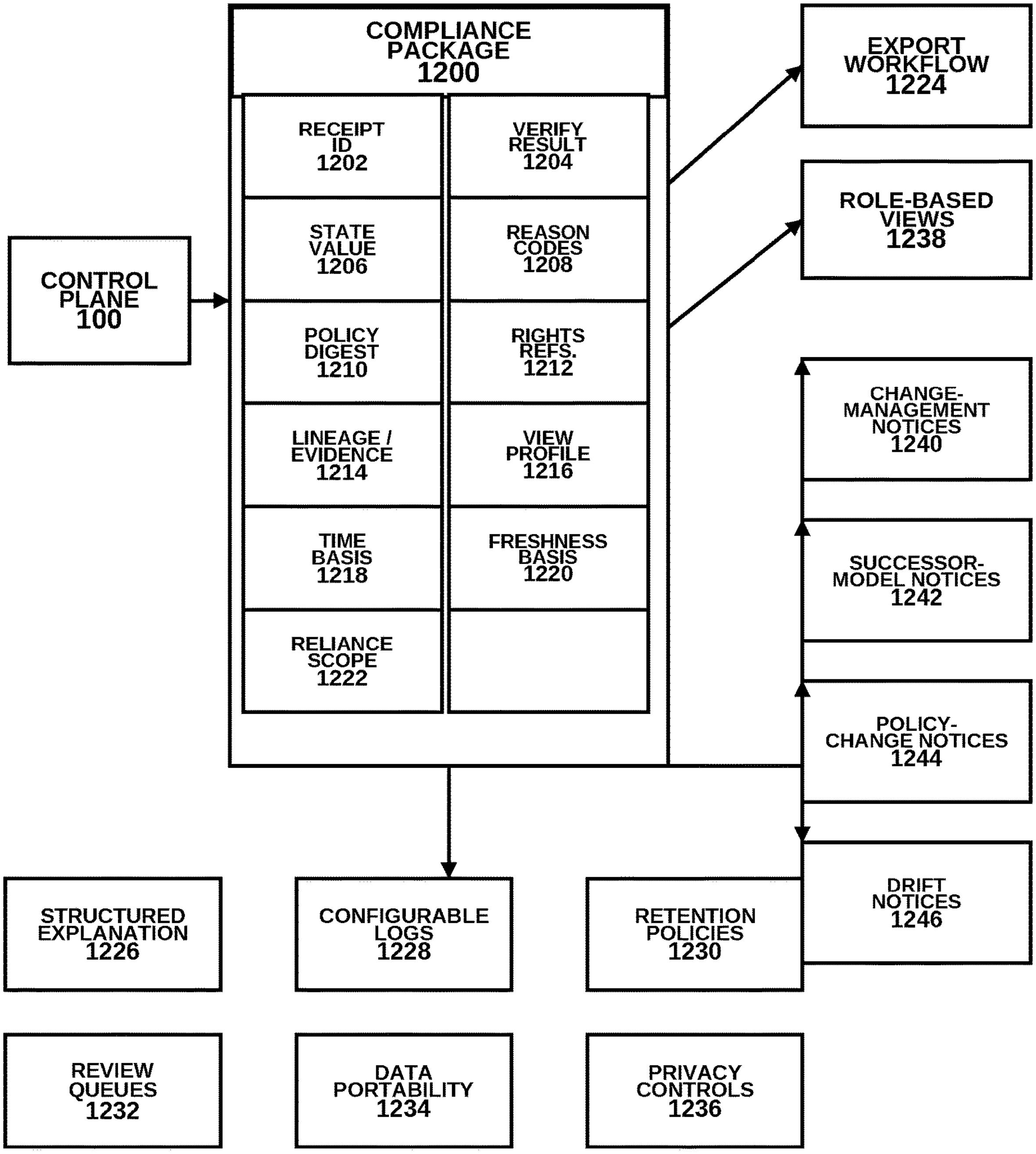
FIG. 12 is a diagram of illustrative procurement, audit, explanation, and compliance-export workflows.

Referring to FIG. 12, the control plane 100 may generate a machine-readable audit or compliance package 1200 comprising one or more of a receipt identifier 1202, a verification result 1204, a release-state value 1206, reason codes 1208, a policy-composition digest 1210, rights references 1212, test-result or lineage and evidence references 1214, view-profile information 1216, time-basis information 1218, freshness-basis information 1220, and reliance-scope information 1222.

In some embodiments, the compliance package 1200 is exportable through an export workflow 1224 in machine-readable formats and is suitable for use by procurement teams, internal governance teams, insurers, auditors, regulators, licensors, customers, or external reviewers. In some embodiments, the compliance package 1200 includes structured explanation fields 1226 without exposing proprietary upstream model internals.

In some embodiments, the system provides configurable logs 1228, retention policies 1230, review queues 1232, data-portability features 1234, privacy-protection controls 1236, and role-based views 1238 that allow different stakeholders to inspect the basis for a release-state outcome according to permissions and confidentiality rules.

In some embodiments, change-management notices 1240, successor-model notices 1242, policy-change notices 1244, and drift notices 1246 are themselves bound into or associated with the release-state architecture, so that downstream relying parties can detect when a previously relied-upon authorization posture may no longer be current.

P. Human Review, Override, and Appeals

In some embodiments, a non-permit state does not end the process. Instead, the architecture may route the package to a review queue, remediation queue, challenge queue, or appeal queue, where a human reviewer, panel, or delegated authority can inspect evidence and decide whether to maintain, narrow, expand, or replace the current authorization posture.

In some embodiments, a human override does not simply bypass the system. Instead, the override is recorded as a state transition, an override reason, or a replacement decision receipt so that the resulting release action remains machine-verifiable and auditable downstream.

In some embodiments, the architecture distinguishes between true deny states and review-pending or exception-route states, thereby allowing speech-sensitive, safety-sensitive, or legally sensitive workflows to preserve explanation and escalation paths rather than forcing unreviewable automated suppression.

Q. Illustrative End-to-End Flows

In one illustrative flow, a media package including a trailer, disclosure objects, attribution objects, and territory metadata is evaluated upstream, issued a decision receipt, and marked permit for publication in selected territories. When a disclosure object is later updated, the release-state service changes publication to reauthorize-required until a fresh package and replacement receipt are produced.

In another illustrative flow, a platform or OEM device receives a release capsule for a package and validates the release capsule, receipt, and current state locally. If the device detects a stale current-state proof, a territory mismatch, or a derivative-lineage mismatch, the device prevents playback, recommendation amplification, or monetization until a valid replacement object is obtained.

In another illustrative flow, an interactive system selects among candidate branches during a live session. The release gate blocks a requested branch because a session-state binding no longer matches and instead activates a neutral fallback branch whose authorization remains current. The session continues without violating the fail-closed architecture.

In another illustrative flow, an external auditor or procurement team receives a signed verification bundle and a machine-readable compliance package. The auditor can verify the current authorization posture, reason codes, lineage references, and view scope without needing access to proprietary audience-simulation models or internal business rules.

R. Computing Implementation, Statutory Categories, and Scope of Equivalents

The disclosed embodiments may be implemented in software, firmware, hardware, or any combination thereof, including as systems, methods, and non-transitory machine-readable media executed in cloud services, on-premises services, edge services, OEM firmware, trusted execution environments, hardware security modules, mobile devices, appliances, browser extensions, middleware, or orchestration layers.

Data stores used herein may be graph stores, relational stores, key-value stores, append-only stores, ledger-backed stores, content-addressed stores, or hybrid stores. Message passing may be synchronous, asynchronous, event-driven, or batch oriented.

The terms decision receipt, release-state registry, release-state service, release gate, release capsule, verification bundle, continuity data, policy profile, action scope, package, branch, derivative lineage, and other named structures are descriptive labels rather than strict implementation limits. Equivalent structures that perform substantially the same machine-verifiable authorization, then-current-state concurrence, action-scoped state mutation, and fail-closed interlock functions are within the scope of the present disclosure.

No embodiment is limited to any one content type, any one vertical, any one evidence source, any one model type, any one standards body, any one signing scheme, any one storage topology, or any one trust arrangement. Different embodiments may combine the disclosed features in different permutations while remaining within the same common inventive concept.

CONCLUSION

The present disclosure therefore provides a unified release-state control plane in which machine-executed release-related actions are conditioned on execution-time concurrence between decision-receipt validation and then-current release-state authorization, together with fail-closed execution, action-scoped state mutation, portable reliance, post-issuance change management, and support for platform, OEM, licensing, compliance, and procurement workflows.

The foregoing description is illustrative and not limiting. Variations, substitutions, rearrangements, and equivalents will be apparent to those skilled in the art in light of the present disclosure.

APPENDICES

The following appendices provide illustrative, non-limiting terminology, matrices, schemas, and worked examples related to the release-state control plane disclosed herein.

Unless expressly stated otherwise, the appendices are exemplary and non-limiting. No appendix is required in all embodiments. Features described in one appendix may be used alone or in combination with features described elsewhere in this specification.

Nothing in these appendices requires any particular serialization format, storage topology, signing arrangement, state taxonomy, graph representation, policy taxonomy, or industry vertical unless a claim expressly so requires.

Appendix A—Glossary of Illustrative Terms

Action-scoped state transition record means a machine-readable record representing a resulting posture for a particular requested release-related action, such as permit, limited-permit, hold, deny, remediation, review, escrow, suspended, challenged, expired, or reauthorize-required, as determined under the disclosed release-state control plane.

Action-specific package-continuity profile means a machine-readable rule set identifying which component classes, continuity checks, substitutions, transformations, overlays, or companion components are required, optional, or prohibited for a given requested release-related action.

Bound release-control metadata means machine-readable metadata bound to a package, decision receipt, release-state entry, release capsule, verification bundle, or related control object and used to support authorization, routing, explanation, monetization, rights handling, settlement handling, platform reliance, or downstream verification.

Challenge-clear condition means a validity-condition field indicating that no active challenge, dispute, or blocking challenge status presently prevents the requested release-related action from being authorized.

Companion component means a machine-readable component associated with a digital asset package, including for example a disclosure object, warning object, provenance object, attribution object, accessibility object, rights object, entitlement object, policy-composition object, label, caption, transcript, metadata payload, session-state binding, or territory-specific object.

Constrained action means a machine-executed action that is narrower than an originally requested release-related action and is permitted under a limited-permit posture or other constrained authorization posture.

Decision receipt means a machine-readable authorization object, signed release credential, signed permit, approval record, or equivalent structure that binds at least package continuity data, policy continuity data, an action-scope field, a release-state reference, and one or more validity-condition fields, and that is validated at release time for the requested release-related action.

Dependency graph means a machine-readable graph, map, or equivalent relationship structure recording dependencies among packages, receipts, evidence objects, policies, rights objects, branches, derivative-lineage nodes, rollback domains, overlays, relying parties, entitlement paths, settlement paths, or other authorization-relevant structures.

Derivative lineage means machine-readable data representing how a derivative asset, branch, variant, thumbnail, caption, summary, transformed package, or other downstream artifact was produced from one or more parent assets or parent packages.

Freshness basis means machine-readable information indicating the temporal basis on which a release-state object, verification bundle, or other reliance object is treated as sufficiently current for a requested release-related action.

Freshness-clear condition means a validity-condition field indicating that a relevant current-state object, delegated state object, verification bundle, release capsule, or other reliance object remains within a configured freshness policy for the requested release-related action.

Limited-permit means a machine-readable posture under which a constrained action, constrained channel, constrained territory, constrained recommendation posture, constrained monetization path, constrained branch, or other narrower release-related action is authorized while the originally requested release-related action is not fully authorized.

Policy continuity data means machine-readable data sufficient to determine whether a presented package and requested release-related action remain within an authorized policy composition, baseline policy, overlay set, overlay order, overlay priority scheme, overlay exclusion set, or other policy continuity envelope.

Policy overlay means a machine-readable rule layer composed with a baseline policy profile and selected according to territory, channel, platform, account type, age tier, content class, risk tier, contractual context, or other contextual factor.

Reason code means a machine-readable indication identifying at least one condition, event, failure mode, or review route associated with a resulting authorization posture or release-transition outcome.

Release capsule means a portable reliance object, signed manifest, verifiable credential, status proof, entitlement token, content-credentials-compatible object, or other machine-readable downstream control object that binds or references at least a package identifier or continuity reference, a receipt identifier, a release-state reference, and a policy-composition digest.

Release gate means an interlock, enforcement point, stateful controller, execution guard, or equivalent machine-executed control point that validates a decision receipt, obtains a then-current release state, determines a release-transition outcome, and prevents final execution unless the required permitting conditions are concurrently satisfied.

Release-related action means any machine-executed action by which a digital asset package is prepared, published, transmitted, rendered, displayed, streamed, recommended, amplified, syndicated, monetized, licensed, exported, ingested by a platform, activated in a live or interactive session, made available to an OEM device, or otherwise advanced to a downstream state with real-world effect.

Release-state reference means a machine-readable identifier, pointer, key, digest, handle, URI, or equivalent lookup value sufficient to obtain, verify, or resolve a then-current release state relevant to a requested release-related action.

Release-state registry means a status service, control ledger, state store, signed-state service, append-only record, cache-backed responder, or equivalent state-maintenance structure in which machine-readable authorization posture is recorded, updated, queried, or derived.

Reliance scope means a machine-readable indication of the channel, territory, platform, device class, relying party, session, account type, or other context within which a verification bundle, release capsule, delegated state, or other portable reliance object may properly be treated as sufficient.

Rollback domain means a logical grouping of packages, receipts, evidence objects, rights families, branch families, disclosure families, model families, cohort families, OEM deployments, derivative families, or other authorization paths such that a detected change may propagate within the domain without necessarily producing identical state changes in unrelated domains.

Signed state object means a machine-readable state value or state structure that is cryptographically signed, attested, or otherwise integrity protected and that may include freshness metadata, reason codes, remediation data, or related machine-readable state information.

Signed verification bundle means a signed machine-readable bundle produced by an offline verifier or comparable verification subsystem and including at least a verification result together with one or more auxiliary fields supporting local reliance, review, audit, or downstream control.

Then-current release state means the release-state value, signed state object, or equivalent current authorization posture corresponding to a digital asset package and a requested release-related action at the time of release-gate decisioning, as distinguished from an issuance-time or recorded decision-state field within a previously issued decision receipt.

Trust-boundary-satisfied condition means a validity-condition field indicating that one or more trust requirements, such as required signing domain, trusted execution requirement, witness requirement, or attestation requirement, are satisfied for the requested release-related action.

Validity-condition fields means machine-verifiable conditions required for a requested release-related action, including for example freshness-clear, challenge-clear, trust-boundary-satisfied, required-overlay-present, required-companion-component-present, state-not-expired, derivative-lineage-consistent, or reliance-scope-match conditions.

View profile means a machine-readable indicator specifying which fields, redactions, representations, or visibility rules apply when presenting a verification bundle, release capsule, compliance package, or other output to a particular relying party or stakeholder class.

View scope means machine-readable information identifying the field families, redactions, visibility boundaries, or disclosure extent associated with a particular view-profile identifier for a signed verification bundle, release capsule, compliance package, or related portable reliance object.

Appendix B—Illustrative Reason-Code/State Matrix

The following reason-code and state matrix is illustrative and non-limiting. A given embodiment may use fewer states, additional states, fewer reason-code classes, additional reason-code classes, hierarchical reason codes, composite reason codes, or implementation-specific mapping logic.

In an illustrative permit posture, the release-transition outcome authorizes the requested release-related action because the presented decision receipt validates for the requested action and the then-current release state authorizes that requested action. Illustrative permit-associated reason codes may include VALID_RECEIPT, VALID_CURRENT_STATE, CONTINUITY_OK, POLICY_OK, and PERMIT_SCOPE_MATCH.

In an illustrative limited-permit posture, the originally requested release-related action is not fully authorized, but a constrained action remains authorized within current bounds. Illustrative limited-permit reason codes may include LABEL_REQUIRED, TERRITORY_REDUCED, CHANNEL_RESTRICTED, RANKING_RESTRICTED, FALLBACK_BRANCH_REQUIRED, ALT_MONETIZATION_PATH, or OEM_LOCAL_ONLY.

In an illustrative hold posture, the requested release-related action is not presently permitted but may become permitted after remediation, waiting, review, or updated state retrieval. Illustrative hold reason codes may include FRESHNESS_RECHECK_REQUIRED, REVIEW_PENDING, OVERLAY_UPDATE_PENDING, COMPANION_COMPONENT_PENDING, EXTERNAL_ANCHOR_PENDING, or POLICY_RECOMPOSITION_REQUIRED.

In an illustrative deny posture, the requested release-related action is blocked and cannot proceed unless a new authorization path is established. Illustrative deny reason codes may include INVALID_SIGNATURE, SCHEMA_MISMATCH, CONTINUITY_BREACH, MISSING_REQUIRED_COMPONENT, RIGHTS_DEFICIENCY, PLATFORM_MISMATCH, PROHIBITED_SCOPE, or TRUST_BOUNDARY_FAILURE.

In an illustrative expired posture, a previously sufficient state or reliance object no longer remains sufficient because an applicable time basis, freshness policy, expiry field, or bounded validity period has elapsed. Illustrative expired reason codes may include RECEIPT_EXPIRED, STATE_EXPIRED, FRESHNESS_WINDOW_EXCEEDED, or CACHE_RELIANCE_EXPIRED.

In an illustrative challenged posture, a dispute, challenge, or review-triggering event has been associated with the relevant authorization path such that prior evidence may remain historically visible but is insufficient for future permit decisions. Illustrative challenged reason codes may include ACTIVE_CHALLENGE, RIGHTS_CHALLENGE, SOURCE_CHALLENGE, REGULATORY_CHALLENGE, or EXTERNAL_NOTICE_OF_CHALLENGE.

In an illustrative suspended posture, the system has paused authorization for the requested release-related action pending additional verification, policy action, contractual action, or external dependency resolution. Illustrative suspended reason codes may include SUSPENDED_BY_POLICY, SUSPENDED_BY_CONTRACT, SUSPENDED_BY_PLATFORM, or SUSPENDED_BY_TRUST_ADMINISTRATION.

In an illustrative escrow posture, the requested release-related action or an associated monetization, entitlement, settlement, or payout path is held in an escrow-like condition pending resolution of a challenge, review, or contingent event. Illustrative escrow reason codes may include MONETIZATION_ESCROW, RIGHTS_ESCROW, SETTLEMENT_ESCROW, or TERRITORY_ESCROW.

In an illustrative reauthorize-required posture, prior authorization evidence remains part of the historical record but is no longer sufficient for future release-related action without a fresh authorization path. Illustrative reason codes may include REAUTH_REQUIRED_POLICY_CHANGE, REAUTH_REQUIRED_DISCLOSURE_CHANGE, REAUTH_REQUIRED_PACKAGE_CHANGE, REAUTH_REQUIRED_DERIVATIVE_CHANGE, REAUTH_REQUIRED_MODEL_CHANGE, or REAUTH_REQUIRED_COHORT_CHANGE.

In an illustrative review or remediation posture, the requested release-related action is routed to a human review queue, remediation queue, challenge queue, appeal queue, or exception route rather than being silently or unreviewably suppressed. Illustrative reason codes may include HUMAN_REVIEW_REQUIRED, REMEDIATION_ROUTE_ASSIGNED, APPEAL_ROUTE_ASSIGNED, or EXCEPTION_ROUTE_ALLOWED.

Reason codes may be represented as flat codes, hierarchical codes, code families, severity-tagged codes, remediation-linked codes, or combinations thereof. A single release-transition outcome may include one or more primary reason codes together with one or more secondary reason codes.

In some embodiments, a reason-code matrix is action scoped. The same package may have PERMIT for packaging, HOLD for publication, DENY for monetization, and LIMITED_PERMIT for recommendation posture, with different reason-code sets attached to each action scope.

In some embodiments, reason codes may also be view scoped. A first relying party may receive a detailed operational reason code, while a second relying party receives a redacted code family or a coarse-grained explanation that preserves the same underlying state outcome.

In some embodiments, reason codes are stored or bound in one or more of the decision receipt, then-current release state, signed verification bundle, release capsule, machine-readable audit package, state-transition record, or review-route record.

The foregoing state and reason-code matrix is illustrative and non-limiting and does not require any particular taxonomy, count, ordering, serialization, or naming convention.

Appendix C—Illustrative Decision-Receipt and Verification-Bundle Example Schema

The following schema families are illustrative and non-limiting. Fields may be present, omitted, merged, split, renamed, redacted, nested, inherited, referenced, or differently serialized in different embodiments while preserving the same common inventive concept.

An illustrative decision receipt may include one or more of: receipt identifier; schema version; package identifier; package continuity data; component continuity data; policy continuity data; action-scope field; release-state reference; issuance-time or recorded decision-state field; validity-condition fields; evidence digest; signer identity; issuance time; expiry time; freshness constraint; trust-boundary requirement; remediation indicator; limited-permit indicator; review indicator; jurisdiction indicator; device or platform indicator; reliance-scope indicator; external-anchor reference; rights reference; royalty reference; settlement reference; derivative-lineage reference; rollback-domain reference; and view-profile constraint.

In some embodiments, the package continuity data comprises or references one or more exact cryptographic digests, canonicalized digests, segmented digests, Merkle roots, perceptual fingerprints, signed identifiers, stable transformation descriptors, or other integrity references sufficient to determine whether a presented package remains within an authorized continuity envelope.

In some embodiments, the validity-condition fields comprise one or more members selected from: freshness-clear condition; challenge-clear condition; trust-boundary-satisfied condition; required-overlay-present condition; required-companion-component-present condition; state-not-expired condition; derivative-lineage-consistent condition; reliance-scope-match condition; session-state-match condition; territory-match condition; or device-class-match condition.

In some embodiments, the action-scope field identifies one or more actions selected from packaging, publication, distribution, rendering, streaming, transmission, recommendation, amplification, monetization, licensing, export, API serving, branch activation, session-state activation, territory switching, or continued circulation.

In some embodiments, the issuance-time or recorded decision-state field is expressly distinguished from then-current runtime authorization state, such that the receipt may indicate a historical or issuance-time posture while the release gate still requires contemporaneous concurrence with then-current authorization state.

In some embodiments, a decision receipt may be serialized in one or more machine-readable formats including canonical JSON, CBOR, XML, binary encodings, ledger-backed objects, signed manifests, verifiable credentials, or other structured encodings that preserve machine-verifiable field semantics.

An illustrative signed verification bundle may include one or more of: verification result; one or more reason codes; receipt identifier; release-state reference; signed-state-object reference; time basis; freshness basis; reliance scope; view-profile identifier; schema version; optional second-layer attestation; verifier identity; package identifier; package continuity confirmation; component continuity confirmation; policy-composition digest; derivative-lineage result; rollback-domain indicator; companion-component result; external-anchor result; trust-boundary result; local-reliance eligibility result; and state-transition record reference.

In some embodiments, the verification result is selected from permit, limited-permit, hold, deny, expired, challenged, suspended, review, remediation, escrow, reauthorize-required, audit-only, or another machine-readable posture suitable for local reliance.

In some embodiments, a verification bundle may be generated in a first trust domain and later validated in a second trust domain, provided that the second trust domain validates signature, freshness, schema, view scope, reliance scope, and, where present, second-layer attestation.

In some embodiments, the same underlying verification bundle supports multiple stakeholder views. A first view may expose operational details; a second view may expose audit lineage; a third view may expose limited public-facing or regulator-facing fields. Different views may preserve the same underlying release-transition result while exposing different field subsets.

In some embodiments, a verification bundle may serve as sufficient input for a local permit, limited-permit, hold, deny, report, audit, or review workflow only within its stated reliance scope and freshness basis.

In some embodiments, the schema of the decision receipt and the schema of the signed verification bundle may share common field families, including but not limited to receipt identifiers, policy continuity data, package continuity references, release-state references, reason codes, time basis, freshness basis, reliance scope, and view-profile information.

In some embodiments, one or more fields of a decision receipt or signed verification bundle may be indirectly bound through references, hashes, pointers, digests, or signed external objects rather than stored inline.

In some embodiments, one or more receipt fields or bundle fields may be omitted from a particular view, transport object, or local cache while remaining derivable, verifiable, or externally referenceable through the associated receipt identifier, release-state reference, external anchor, or signed state object.

The foregoing schema families are illustrative and do not require a particular key order, nesting arrangement, field count, naming convention, transport format, or serialization language.

Appendix D—Illustrative Dependency-Graph/Rollback-Domain Worked Example

The following worked example is illustrative and non-limiting. Symbolic identifiers such as P1, R1, DR1, RS1, RC1, or B1 are arbitrary labels used for explanatory convenience and do not limit any claim.

In an illustrative configuration, a first package P1 includes a primary digital asset together with companion components including a disclosure object D1, an attribution object A1, a rights object R1, and a policy-composition object O1. A decision receipt DR1 is issued for publication and recommendation scopes, and a then-current release-state entry RS1 records publication=permit and recommendation=limited-permit.

In the same illustrative configuration, a release capsule RC1 is generated for a downstream relying platform, and a branch-specific derivative package P1-BR1 is associated with derivative-lineage node DL1. A second derivative package P1-SUM1 is associated with derivative-lineage node DL2 for a summary or transformed output.

A dependency graph records, at a minimum, relationships among P1, D1, A1, R1, O1, DR1, RS1, RC1, DL1, and DL2. In some embodiments, the dependency graph further records edges to one or more relying parties, channels, territories, entitlement paths, settlement paths, or OEM deployments.

An illustrative rollback-domain mapping places P1 and P1-BR1 in a first rollback domain associated with a shared disclosure family, and places P1-SUM1 in a second rollback domain associated with a transformed summary family. In this example, both rollback domains may share the same rights object R1, while only the first rollback domain requires companion component D1 for publication.

A change event then occurs in which the disclosure object D1 is updated or invalidated. The system detects the change and propagates the event through dependency-graph edges originating from D1 to P1, DR1, RS1, RC1, and DL1. The system does not automatically propagate the identical result to DL2 if the second rollback domain does not require D1 for its relevant action scope.

In response to the detected change, the system updates the then-current release-state entry RS1 such that publication for P1 becomes reauthorize-required, recommendation for P1 becomes hold, and branch activation for P1-BR1 becomes limited-permit with a fallback branch authorized. Previously issued decision receipt DR1 remains available as historical evidence but is insufficient by itself for future permit decisions.

The downstream relying platform receives a request to publish P1. The release gate validates DR1, obtains RS1, and determines that concurrence for publication is absent because the then-current state is reauthorize-required. The requested publication action therefore fails closed, and the system emits one or more reason codes such as REAUTH_REQUIRED_DISCLOSURE_CHANGE and COMPANION_COMPONENT_PENDING.

The same platform receives a request to activate branch package P1-BR1 during a live or interactive session. The release gate validates the relevant receipt and then-current state for branch scope, determines that a limited-permit posture applies, and authorizes a fallback branch rather than the originally requested branch. The resulting constrained action remains within current authorization boundaries.

In parallel, an auditor or OEM relying system may receive a signed verification bundle referencing DR1 and RS1. The local relying system validates signature, freshness, schema, view scope, and reliance scope. Because the verification bundle reflects the updated state, the local relying system denies publication while allowing only those local workflows that remain within the constrained or limited-permit posture.

A reauthorization workflow then produces a replacement disclosure object D2, an updated package P2, a replacement decision receipt DR2, and an updated then-current release state RS2. The dependency graph records lineage from P1 to P2, and the rollback-domain mapping updates affected nodes. Publication for P2 may then return to permit, while derivative packages or channels that remain non-compliant continue to be held or reauthorize-required.

In some embodiments, a challenge to the shared rights object R1 instead of the disclosure object D1 would propagate through a different edge set and could affect both rollback domains. For example, the system may move monetization to escrow for P1, P1-BR1, and P1-SUM1, while leaving certain non-monetized review or audit workflows available.

In some embodiments, the affected subset calculation considers at least one of dependency-graph edges, rollback-domain membership, derivative-lineage relationships, action scope, territory, channel, relying party, entitlement path, settlement path, or trust-boundary constraints.

In some embodiments, the system stores machine-readable evidence showing which nodes, edges, domains, and scopes participated in the affected-subset calculation, thereby supporting later review, audit, explanation, appeal, or procurement verification without requiring disclosure of proprietary upstream model internals.

The worked example above illustrates that previously issued receipts may remain part of the evidentiary record while then-current authorization state changes independently, that rollback domains need not be identical across all derivative paths, and that the disclosed architecture supports fine-grained, fail-closed propagation of change events without requiring indiscriminate shutdown of unrelated authorization paths.

The foregoing appendices are illustrative and non-limiting and may be included, omitted, reordered, or expanded in different embodiments without departing from the common inventive concept disclosed herein.

Appendix E—Signed State Object Verification and Delegation Model

In some embodiments, the release-state service returns, or resolves to, a signed state object that includes a current action-scoped posture value together with freshness metadata and one or more integrity or provenance fields. Illustrative integrity or provenance fields include a state-object identifier, signer identity, signing domain identifier, certificate-chain reference, witness-set reference, transparency-log reference, timestamp-authority reference, or remote-attestation reference.

In some embodiments, the release gate verifies a signature of the signed state object prior to treating the signed state object as authorizing for a requested release-related action. Signature verification may include verifying a certificate chain or trust-list membership for the signer, verifying an expected signing domain or trust boundary, verifying an associated timestamp or freshness window, and verifying that the signed state object is within a configured reliance scope for the requested action.

In some embodiments, the signed state object includes a cache-reliance bound, delegated-reliance bound, or stale-while-revalidate indicator that limits how long, and for which action scopes, cached or delegated state may be relied upon. Illustrative fields include a max-cache-age, an expiry time, a validity-period field, a low-risk-scope list, a required-online-check flag, or a delegate-identifier allowlist.

In some embodiments, delegated or federated state is used. A first trust domain maintains an authoritative state service while a second trust domain provides a cache-backed state responder that returns a signed delegated state object together with evidence of delegation. Delegation evidence may include a delegator signature over a delegate key, a delegation scope, a delegation time window, and an action-scope list. The release gate treats delegated state as sufficient only when delegation evidence validates and remains within configured freshness and scope constraints.

In some embodiments, delegation evidence further binds a delegate identity, a subagent identity, a tool or API scope, an operation class, a destination scope, a session scope, a revocation handle, or a maximum derivation depth, such that a delegated state object authorizes only a bounded subset of downstream actions and cannot be validly expanded beyond the delegated scope.

In some embodiments, when a signed state object is unavailable or stale beyond a configured freshness policy for a requested action, the release gate fails closed for that requested action and records a corresponding action-scoped state transition record. In other embodiments, for explicitly configured low-risk action scopes, the release gate may permit a constrained fallback execution path while simultaneously recording a non-permit, hold, or review posture and requiring revalidation against a fresh signed state object before any higher-risk scope is permitted.

In some embodiments, a signed state object or related portable reliance object further includes a sequence value, monotonic counter, nonce binding, challenge binding, predecessor-state reference, or anti-rollback proof, such that a relying system can detect replay, rollback, out-of-order state use, or stale-state substitution before permitting a requested release-related action.

Appendix F—Reason-Code-Driven Remediation Artifacts

In some embodiments, the control plane maps one or more machine-readable reason codes to a machine-readable remediation artifact set that identifies which companion components, overlays, attestations, or proofs are required to establish a new authorization path. The remediation artifact set may be returned by the release gate, stored in a review-route record, or included in a compliance package.

In some embodiments, a remediation artifact set includes one or more artifact descriptors, each artifact descriptor comprising an artifact type identifier, a required schema version, a required field family list, an integrity reference requirement, an optional signer or trust-boundary requirement, and an action-scope applicability field. Artifact descriptors may further include an ordering constraint, a dependency constraint, or an expiration or freshness constraint.

Illustrative mappings include: (i) a RIGHTS_DEFICIENCY reason code mapping to a rights object, license proof, or entitlement object together with a settlement-routing reference; (ii) a DISCLOSURE_PENDING or MISSING_REQUIRED_COMPONENT reason code mapping to a disclosure object, label object, caption, transcript, or accessibility object required for the requested action scope; (iii) a TRUST_BOUNDARY_FAILURE reason code mapping to a required attestation, witness signature, or trusted execution requirement; and (iv) a POLICY_RECOMPOSITION_REQUIRED reason code mapping to a required overlay set or updated policy-composition digest.

In some embodiments, remediation artifacts are themselves bound to an updated decision receipt, an updated release capsule, or an updated state transition record, such that a relying party can verify that remediation steps were completed before a subsequent permit posture was established for the requested release-related action.

Appendix G—Canonical Policy-Composition Digest and Overlay Conflict Rules

In some embodiments, a policy-composition digest is computed deterministically from a baseline policy profile and one or more overlays by applying a canonicalization procedure that produces a stable serialization for hashing or signing. Canonicalization may include deterministic overlay ordering, deterministic key ordering, normalization of numeric and boolean values, and removal of non-semantic fields prior to hashing.

In some embodiments, overlays are selected according to contextual factors such as territory, channel, platform, account type, age tier, content class, risk tier, or contractual context, and are then sorted according to an overlay priority scheme. The canonicalization procedure applies overlays in priority order and produces a composed policy representation that is serialized in canonical form and hashed to yield the policy-composition digest.

In some embodiments, overlay conflict rules are machine-readable. Illustrative conflict rules include overlay exclusion rules, mutual-exclusion groups, precedence rules, override tokens, and conflict-resolution directives that select among competing obligations. A conflict rule may require a review posture when a conflict cannot be resolved automatically under the configured rules.

In some embodiments, the release gate validates policy continuity by recomputing or verifying the policy-composition digest for the requested action scope and comparing it to a digest bound in the decision receipt or release capsule. A mismatch causes the requested action to fail closed or to move to limited-permit, hold, suspended, or reauthorize-required according to the configured policy profile.

In some embodiments, policy continuity is established not only from a composed policy representation but also from a deterministic policy-execution artifact comprising one or more of policy bytecode, an execution trace digest, a rule-evaluation transcript digest, a policy-engine version identifier, or a canonical policy virtual-machine state digest.

Appendix H—Selective Disclosure and Proof-Bound Views for Verification Bundles In some embodiments, a verification bundle is produced in a form that supports selective disclosure. A first view may redact certain fields while remaining cryptographically bound to an underlying committed bundle. Selective disclosure may be implemented using commitments, Merkle proofs, hash-based redaction, or zero-knowledge proof techniques that allow a relying party to verify that a redacted view corresponds to the same underlying authorization result.

In some embodiments, a view profile specifies which field families are visible, redacted, generalized, or replaced with code families, while preserving verifiability of the release-transition outcome, freshness basis, and reliance scope. A regulator-facing view may omit proprietary evidence digests while still allowing verification of signatures, state freshness, and posture outcome; an operator-facing view may include detailed remediation fields and operational reason codes.

In some embodiments, a proof-bound view includes: (i) a committed-bundle identifier; (ii) a set of disclosed fields; (iii) one or more proofs that the disclosed fields are consistent with a committed underlying bundle; and (iv) a signature over the view or over the committed bundle. A relying party validates the signature and proofs prior to treating the view as sufficient for a local workflow.

Appendix I—Derivative-Lineage Computation and Transform Descriptors

In some embodiments, derivative-lineage data is computed as a deterministic lineage identifier derived from at least: a parent package identifier or continuity reference, a derivative artifact identifier, a transform descriptor, and one or more tool or process references. The lineage identifier may be a cryptographic digest over these fields or a signed lineage record.

In some embodiments, a transform descriptor is a machine-readable structure that describes one or more allowed transformations applied to a parent asset to obtain a derivative artifact. Illustrative transformation fields include re-encoding parameters, resizing parameters, container changes, watermarking parameters, label insertion parameters, accessibility augmentation parameters, summarization parameters, or thumbnail-generation parameters. The transform descriptor may include a stable transformation descriptor sufficient to determine whether the derivative artifact remains within an authorized continuity envelope.

In some embodiments, the release gate validates derivative-lineage consistency by verifying that a derivative-lineage identifier bound in a decision receipt, release capsule, or verification bundle corresponds to the presented derivative artifact and its transform descriptor. A mismatch causes the requested action to fail closed or to move to a constrained posture for the derivative scope.

In some embodiments, revocation, suspension, challenge, or reauthorize-required status is propagated to one or more caches, delegated responders, OEM devices, CDN nodes, marketplace systems, browsers, application runtimes, or local validators together with a revocation proof, propagation scope, effective time, and required local fail-closed response.

Appendix J—Escrow and Settlement Routing Rules by Authorization Posture

In some embodiments, monetization, entitlement, settlement, or royalty routing is conditioned on the authorization posture recorded in a then-current release state or an action-scoped state transition record. A permit posture may activate a normal payout route, while a challenged posture may route payouts to an escrow account, a suspense account, or a delayed settlement route pending resolution.

In some embodiments, a limited-permit posture authorizes an alternate monetization path that remains within current authorization boundaries, such as a non-personalized ad posture, a reduced territory set, a neutral entitlement rule, or a labeling-required distribution posture. A deny posture suspends monetization and may require a remediation or reauthorization workflow prior to any payout.

In some embodiments, escrow routing is action scoped and may differ by channel, territory, platform, derivative path, or relying party. A settlement reference or royalty reference bound in a decision receipt or release capsule may indicate which escrow rule set applies and may be updated when a challenge event changes state for a subset of scopes.

Appendix K—Synthetic Audience Cohort Manifests and Creative Decision Receipts In some embodiments, and without limiting the broader control-plane embodiments disclosed herein, a synthetic-audience engine uses one or more cohort manifests and model manifests to generate predicted reaction, comprehension, comfort, engagement, confusion, disclosure-effect, or conversion-related outputs for candidate assets or variants.

In some embodiments, a cohort manifest includes a cohort identifier, demographic abstraction fields, a training-rights or data-provenance digest, a banned-source exclusion list, a representational weighting vector or diversity floor, a bias bound, a jurisdictional policy profile identifier, and a cohort refresh history. The synthetic-audience engine produces a reaction summary digest that is bound into an evidence digest or referenced by a decision receipt.

In some embodiments, the control plane evaluates synthetic-audience outputs using governance predicates. Illustrative governance predicates include a rights-provenance-clear predicate, a representational-bounds predicate, a manipulation-risk predicate, and an exclusion-rule predicate. Failure of a governance predicate causes the requested action to move to hold, deny, suspended, or reauthorize-required according to the configured policy profile, and one or more machine-readable reason codes are recorded.

In some embodiments, a creative decision receipt is generated that records, in machine-readable form, which candidate variant was evaluated, which cohort manifest and model manifest were used, which predicted reaction summary was produced, and which edit or selection decision was taken. The creative decision receipt may further include a decision-maker signature, an override reason field, and a binding to a resulting release asset package identifier, thereby enabling later audit of how synthetic-audience outputs influenced a release-related action.

In some embodiments, a decision receipt used by the release gate binds or references a creative decision receipt, a cohort manifest identifier, or a reaction summary digest as part of its evidence-digest fields, such that a relying party can verify that a release decision was based on a permitted cohort configuration and a permitted evaluation outcome without requiring disclosure of proprietary model internals.

The invention claimed is:

1. A computer-implemented system for controlling machine-executed release-related actions for a digital asset package, the system comprising:

one or more processors; and memory storing instructions that, when executed by the one or more processors, cause the system to:

identify a requested release-related action for a digital asset package;

obtain a machine-readable decision receipt associated with the digital asset package, the machine-readable decision receipt binding together at least (i) package continuity data for the digital asset package, (ii) policy continuity data, (iii) an action-scope field corresponding to the requested release-related action, (iv) a release-state reference, and (v) one or more validity-condition fields;

validate the machine-readable decision receipt by verifying authenticity, including signature validity where the machine-readable decision receipt is signed, schema conformance, package continuity for the requested release-related action, policy continuity, action-scope continuity, and satisfaction of the one or more validity-condition fields;

obtain, using the release-state reference at execution time, a then-current machine-readable release state corresponding to the digital asset package and the requested release-related action, the then-current machine-readable release state comprising (A) a signed state object including freshness metadata or (B) machine-readable state data resolved from the signed state object, wherein the signed state object comprises a current action-scoped posture value and is maintained or resolved independently of the machine-readable decision receipt, is updatable after issuance of the machine-readable decision receipt for the requested release-related action without modifying the machine-readable decision receipt, and includes at least one current-state continuity field selected from (i) a nonce binding or challenge binding generated for the requested release-related action, (ii) a monotonic counter maintained by a release-state service, release-state registry, or state-maintenance structure for the requested release-related action, or (iii) an anti-rollback proof bound to a previously accepted current-state object for the same action scope as the requested release-related action;

verify the signed state object, and any machine-readable state data resolved therefrom, by validating signature or attestation, freshness, action-scope match, and the at least one current-state continuity field against a current-state continuity condition maintained for the same action scope as the requested release-related action, and, where the signed state object or resolved state data is delegated, cached, or relied upon across a trust boundary, validating signer identity or delegation scope, trust-boundary satisfaction, and reliance scope, wherein the verification is configured to detect replay, rollback, out-of-order state use, or stale-state substitution before permitting the requested release-related action;

determine a release-transition outcome that permits the requested release-related action only when the machine-readable decision receipt validates and the then-current machine-readable release state authorizes the requested release-related action, including by confirming that (i) the machine-readable decision receipt validates for the requested release-related action, (ii) the verified signed state object, or machine-readable state data resolved from the verified signed state object, represents a then-current non-stale authorization posture for the requested release-related action, and (iii) package continuity and policy continuity are satisfied for the digital asset package under the requested release-related action, and the action-scope field authorizes the requested release-related action, and, where the machine-readable decision receipt includes an issuance-time field or recorded decision-state field, determine runtime authorization from the then-current machine-readable release state rather than solely from the issuance-time field or recorded decision-state field, wherein the verification of the signed state object and the determination of the release-transition outcome are performed after receipt of the requested release-related action and before issuing an execute instruction to a downstream controller;

responsive to the release-transition outcome, record or cause recording of an action-scoped state transition record in at least one release-state registry, state store, append-only record, cache-backed state responder, or a machine-readable state-maintenance structure configured to store or resolve action-scoped authorization posture, the action-scoped state transition record representing an action-scoped authorization posture selected from permit, limited-permit, hold, deny, expired, challenged, suspended, escrow, remediation, review, and reauthorize-required for the requested release-related action;

responsive to the release-transition outcome permitting the requested release-related action, cause a downstream controller to execute the requested release-related action; and responsive to the release-transition outcome not permitting the requested release-related action, including because signature, attestation, freshness, action-scope, or current-state-continuity validation fails, because applicable signer-identity, delegation-scope, trust-boundary, or reliance-scope validation fails for delegated, cached, or cross-trust-boundary reliance, or because replay, rollback, out-of-order state use, or stale-state substitution is detected, prevent execution of the requested release-related action in a fail-closed manner and output at least one machine-readable reason code.

2. The system of claim 1, wherein the digital asset package comprises a primary digital asset and one or more companion components selected according to an action-specific package-continuity profile, and wherein omission, corruption, or unauthorized substitution of a required companion component causes the release-transition outcome to be limited-permit, hold, deny, or reauthorize-required.

3. The system of claim 1, wherein the package continuity data comprises at least one of an exact cryptographic digest, a canonicalized digest, a segmented digest, a Merkle root, a perceptual fingerprint, a signed identifier, or a stable transformation descriptor.

4. The system of claim 1, wherein the requested release-related action comprises at least one of packaging, publication, distribution, rendering, streaming, transmission, recommendation, ranking amplification, monetization, licensing, export, API serving, branch activation, session-state activation, territory switching, or continued circulation.

5. The system of claim 1, wherein the freshness metadata comprises at least one of a timestamp, expiry field, freshness-window identifier, signed validity-period field, or cache-reliance bound; wherein the system verifies a signature of the signed state object; and wherein cached or delegated state is relied upon only within a configured freshness policy for the requested release-related action.

6. The system of claim 1, wherein the machine-readable decision receipt includes an issuance-time field or recorded decision-state field retained as historical authorization evidence while remaining insufficient by itself to authorize a future requested release-related action.

7. The system of claim 1, wherein the one or more validity-condition fields comprise one or more fields selected from a freshness-clear condition, a challenge-clear condition, a trust-boundary-satisfied condition, a required-overlay-present condition, a required-companion-component-present condition, a state-not-expired condition, a derivative-lineage-consistent condition, and a reliance-scope-match condition.

8. The system of claim 1, wherein the signed state object further comprises signer-identity data or delegation-scope data, and wherein the requested release-related action is permitted based on cached or delegated state only when the signer-identity data or delegation-scope data satisfies a configured trust-boundary requirement for the requested release-related action.

9. The system of claim 1, wherein the instructions further cause the system, responsive to a drift event, challenge event, rights change, consent change, disclosure change, package change, policy change, platform-requirement change, model change, cohort change, or derivative change, to use a dependency graph, rollback-domain mapping, or derivative-lineage mapping to identify an affected subset of packages, receipts, branches, derivative artifacts, channels, territories, relying parties, entitlement paths, or settlement paths and to update the then-current machine-readable release state for the affected subset before a subsequent requested release-related action is permitted.

10. The system of claim 1, wherein the instructions further cause the system to expose or interoperate with an offline verifier that, without requiring direct access to proprietary model internals, validates the machine-readable decision receipt together with a corresponding then-current machine-readable release state, including validation of a signed state object where used, and produces a signed verification bundle comprising a verification result, the at least one machine-readable reason code, a receipt identifier, a release-state reference, a time basis, a freshness basis, a reliance scope, a view-profile identifier, a schema version, and an optional second-layer attestation.

11. The system of claim 10, wherein the signed verification bundle supports differential stakeholder views, and wherein a local relying system validates a signature, freshness, schema, view scope, and reliance scope of the signed verification bundle before treating the signed verification bundle as sufficient input for a local permit, limited-permit, hold, deny, audit, or review workflow.

12. The system of claim 1, wherein the requested release-related action is activation of a branch, scene, prompt, module, or adaptive output path in a live or interactive session, and wherein the machine-readable decision receipt further binds a session-state identifier or session-state hash that is validated before activation.

13. The system of claim 12, wherein, responsive to the requested release-related action not being permitted, the system selects a neutral branch, fallback branch, degraded response path, or preauthorized alternate branch whose associated machine-readable decision receipt validates and whose corresponding then-current machine-readable release state authorizes activation.

14. The system of claim 1, wherein the policy continuity data is derived from a policy profile composed from a baseline profile and one or more overlays selected according to territory, channel, platform, account type, age tier, content class, risk tier, or contractual context, and wherein a change to a required overlay causes the then-current machine-readable release state to transition to limited-permit, hold, deny, suspended, or reauthorize-required for at least one scope.

15. The system of claim 1, wherein the instructions further cause the system to generate or validate a release capsule that binds a package continuity reference, a receipt identifier, the release-state reference, and a policy-composition digest for use by an external platform, publisher, CDN, device, app store, browser, marketplace, or OEM system, the release capsule further binding or referencing at least one of a derivative-lineage identifier, rollback-domain identifier, rights reference, royalty reference, settlement reference, platform-entitlement reference, OEM reliance identifier, or reliance-scope indicator.

16. The system of claim 1, wherein the instructions further cause the system to generate a machine-readable audit or compliance package in a machine-readable format, the machine-readable audit or compliance package comprising one or more of a receipt identifier, verification result, release-state value, reason codes, policy-composition digest, lineage reference, rights reference, evidence reference, time-basis information, freshness-basis information, reliance-scope information, or view-profile identifier for export to a relying system for audit, compliance, governance, or review.

17. The system of claim 1, wherein the instructions further cause the system to route a non-permit outcome to a human review queue, remediation queue, challenge queue, appeal queue, or exception route, and to record any resulting override or replacement authorization as a machine-readable state transition, replacement decision receipt, or both.

18. The system of claim 1, wherein the instructions further cause the system to bind rights metadata, royalty metadata, settlement data, or platform-entitlement data to the digital asset package, the machine-readable decision receipt, the then-current machine-readable release state, or the release capsule, and to change monetization, access, settlement, or entitlement routing according to the release-transition outcome.

19. The system of claim 1, wherein the release-state reference resolves to a centralized service, a federated service, a signed state object, a cache-backed state responder, or an append-only record subject to a freshness policy, and wherein the system uses application programming interfaces, machine-readable data formats, or interoperability adapters for interaction with downstream relying parties while preserving receipt-validation and then-current-state concurrence.

20. The system of claim 1, wherein the release-transition outcome comprises a limited-permit outcome that authorizes a constrained action rather than the requested release-related action, the constrained action comprising at least one of distribution with additional labeling, a reduced territory set, a restricted recommendation posture, a sandbox environment, an alternate monetization path, or a fallback execution path that remains within current authorization boundaries.

21. A computer-implemented method for controlling machine-executed release-related actions for a digital asset package, the method comprising:

identifying a requested release-related action for a digital asset package;

obtaining a machine-readable decision receipt associated with the digital asset package, the machine-readable decision receipt binding together at least package continuity data, policy continuity data, an action-scope field corresponding to the requested release-related action, a release-state reference, and one or more validity-condition fields;

validating the machine-readable decision receipt by verifying authenticity, including signature validity where the machine-readable decision receipt is signed, schema conformance, package continuity for the requested release-related action, policy continuity, action-scope continuity, and satisfaction of the one or more validity-condition fields;

obtaining, using the release-state reference at execution time, a then-current machine-readable release state corresponding to the digital asset package and the requested release-related action, the then-current machine-readable release state comprising (A) a signed state object including freshness metadata or (B) machine-readable state data resolved from the signed state object, wherein the signed state object comprises a current action-scoped posture value and is maintained or resolved independently of the machine-readable decision receipt, is updatable after issuance of the machine-readable decision receipt for the requested release-related action without modifying the machine-readable decision receipt, and includes at least one current-state continuity field selected from (i) a nonce binding or challenge binding generated for the requested release-related action, (ii) a monotonic counter maintained by a release-state service, release-state registry, or state-maintenance structure for the requested release-related action, or (iii) an anti-rollback proof bound to a previously accepted current-state object for the same action scope as the requested release-related action;

verifying the signed state object, and any machine-readable state data resolved therefrom, by validating signature or attestation, freshness, action-scope match, and the at least one current-state continuity field against a current-state continuity condition maintained for the same action scope as the requested release-related action, and, where the signed state object or resolved state data is delegated, cached, or relied upon across a trust boundary, validating signer identity or delegation scope, trust-boundary satisfaction, and reliance scope, wherein the verification is configured to detect replay, rollback, out-of-order state use, or stale-state substitution before permitting the requested release-related action;

determining a release-transition outcome that permits the requested release-related action only when the machine-readable decision receipt validates and the then-current machine-readable release state authorizes the requested release-related action, including by confirming that (i) the machine-readable decision receipt validates for the requested release-related action, (ii) the verified signed state object, or machine-readable state data resolved from the verified signed state object, represents a then-current non-stale authorization posture for the requested release-related action, and (iii) package continuity and policy continuity are satisfied for the digital asset package under the requested release-related action, and the action-scope field authorizes the requested release-related action, and, where the machine-readable decision receipt includes an issuance-time field or recorded decision-state field, determining runtime authorization from the then-current machine-readable release state rather than solely from the issuance-time field or recorded decision-state field, wherein the verifying of the signed state object and the determining of the release-transition outcome are performed after receipt of the requested release-related action and before issuing an execute instruction to a downstream controller;

responsive to the release-transition outcome, recording or causing recording of an action-scoped state transition record in at least one release-state registry, state store, append-only record, cache-backed state responder, or a machine-readable state-maintenance structure configured to store or resolve action-scoped authorization posture, the action-scoped state transition record representing an action-scoped authorization posture selected from permit, limited-permit, hold, deny, expired, challenged, suspended, escrow, remediation, review, and reauthorize-required for the requested release-related action;

responsive to the release-transition outcome permitting the requested release-related action, causing a downstream controller to execute the requested release-related action; and responsive to the release-transition outcome not permitting the requested release-related action, including because signature, attestation, freshness, action-scope, or current-state-continuity validation fails, because applicable signer-identity, delegation-scope, trust-boundary, or reliance-scope validation fails for delegated, cached, or cross-trust-boundary reliance, or because replay, rollback, out-of-order state use, or stale-state substitution is detected, preventing execution of the requested release-related action in a fail-closed manner and outputting at least one machine-readable reason code.

22. The method of claim 21, wherein the freshness metadata comprises at least one of a timestamp, expiry field, freshness-window identifier, signed validity-period field, or cache-reliance bound; wherein the method verifies a signature of the signed state object; and wherein cached or delegated state is relied upon only within a configured freshness policy for the requested release-related action.

23. The method of claim 21, wherein the digital asset package comprises a primary digital asset and one or more companion components selected according to an action-specific package-continuity profile, and wherein validating the machine-readable decision receipt further comprises checking at least a required-companion-component-present condition and a reliance-scope-match condition.

24. The method of claim 21, further comprising, responsive to a drift event, challenge event, rights change, consent change, disclosure change, package change, policy change, platform-requirement change, model change, cohort change, or derivative change, using a dependency graph, rollback-domain mapping, or derivative-lineage mapping to identify an affected subset of packages, receipts, branches, derivative artifacts, channels, territories, relying parties, entitlement paths, or settlement paths and updating the then-current machine-readable release state for the affected subset before permitting a subsequent requested release-related action.

25. The method of claim 21, further comprising, with an offline verifier and without requiring access to proprietary model internals, validating the machine-readable decision receipt together with a corresponding then-current machine-readable release state, including validation of a signed state object where used, generating a signed verification bundle, and validating the signed verification bundle for a local relying system according to signature, freshness, schema, view scope, and reliance scope.

26. A non-transitory computer-readable medium storing instructions that, when executed by one or more processors, cause a system to:

identify a requested release-related action for a digital asset package;

obtain a machine-readable decision receipt associated with the digital asset package, the machine-readable decision receipt binding together at least package continuity data, policy continuity data, an action-scope field corresponding to the requested release-related action, a release-state reference, and one or more validity-condition fields;

validate the machine-readable decision receipt by verifying authenticity, including signature validity where the machine-readable decision receipt is signed, schema conformance, package continuity for the requested release-related action, policy continuity, action-scope continuity, and satisfaction of the one or more validity-condition fields;

obtain, using the release-state reference at execution time, a then-current machine-readable release state corresponding to the digital asset package and the requested release-related action, the then-current machine-readable release state comprising (A) a signed state object including freshness metadata or (B) machine-readable state data resolved from the signed state object, wherein the signed state object comprises a current action-scoped posture value and is maintained or resolved independently of the machine-readable decision receipt, is updatable after issuance of the machine-readable decision receipt for the requested release-related action without modifying the machine-readable decision receipt, and includes at least one current-state continuity field selected from (i) a nonce binding or challenge binding generated for the requested release-related action, (ii) a monotonic counter maintained by a release-state service, release-state registry, or state-maintenance structure for the requested release-related action, or (iii) an anti-rollback proof bound to a previously accepted current-state object for the same action scope as the requested release-related action;

verify the signed state object, and any machine-readable state data resolved therefrom, by validating signature or attestation, freshness, action-scope match, and the at least one current-state continuity field against a current-state continuity condition maintained for the same action scope as the requested release-related action, and, where the signed state object or resolved state data is delegated, cached, or relied upon across a trust boundary, validating signer identity or delegation scope, trust-boundary satisfaction, and reliance scope, wherein the verification is configured to detect replay, rollback, out-of-order state use, or stale-state substitution before permitting the requested release-related action;

determine a release-transition outcome that permits the requested release-related action only when the machine-readable decision receipt validates and the then-current machine-readable release state authorizes the requested release-related action, including by confirming that (i) the machine-readable decision receipt validates for the requested release-related action, (ii) the verified signed state object, or machine-readable state data resolved from the verified signed state object, represents a then-current non-stale authorization posture for the requested release-related action, and (iii) package continuity and policy continuity are satisfied for the digital asset package under the requested release-related action, and the action-scope field authorizes the requested release-related action, and, where the machine-readable decision receipt includes an issuance-time field or recorded decision-state field, determine runtime authorization from the then-current machine-readable release state rather than solely from the issuance-time field or recorded decision-state field, wherein the verification of the signed state object and the determination of the release-transition outcome are performed after receipt of the requested release-related action and before issuing an execute instruction to a downstream controller;

responsive to the release-transition outcome, record or cause recording of an action-scoped state transition record in at least one release-state registry, state store, append-only record, cache-backed state responder, or a machine-readable state-maintenance structure configured to store or resolve action-scoped authorization posture, the action-scoped state transition record representing an action-scoped authorization posture selected from permit, limited-permit, hold, deny, expired, challenged, suspended, escrow, remediation, review, and reauthorize-required for the requested release-related action;

responsive to the release-transition outcome permitting the requested release-related action, cause a downstream controller to execute the requested release-related action; and responsive to the release-transition outcome not permitting the requested release-related action, including because signature, attestation, freshness, action-scope, or current-state-continuity validation fails, because applicable signer-identity, delegation-scope, trust-boundary, or reliance-scope validation fails for delegated, cached, or cross-trust-boundary reliance, or because replay, rollback, out-of-order state use, or stale-state substitution is detected, prevent execution of the requested release-related action in a fail-closed manner and output at least one machine-readable reason code.

27. The non-transitory computer-readable medium of claim 26, wherein the freshness metadata comprises at least one of a timestamp, expiry field, freshness-window identifier, signed validity-period field, or cache-reliance bound; wherein the instructions further cause the system to verify a signature of the signed state object; and wherein cached or delegated state is relied upon only within a configured freshness policy for the requested release-related action.

28. The non-transitory computer-readable medium of claim 26, wherein the digital asset package comprises a primary digital asset and one or more companion components selected according to an action-specific package-continuity profile, and wherein the one or more validity-condition fields include at least a required-companion-component-present condition and a reliance-scope-match condition.

29. The non-transitory computer-readable medium of claim 26, wherein the instructions further cause the system to validate, for a local relying system, (i) a signed verification bundle by checking signature, freshness, schema, view scope, and reliance scope, or (ii) a release capsule that binds at least a package continuity reference, a receipt identifier, the release-state reference, and a policy-composition digest by checking integrity or signature, freshness, schema, and reliance scope, before the local relying system treats the validated object as sufficient input for a local permit, limited-permit, hold, deny, audit, or review workflow.

30. The non-transitory computer-readable medium of claim 26, wherein the instructions further cause the system, responsive to a non-permit outcome, to route the digital asset package to a human review queue, remediation queue, challenge queue, appeal queue, or exception route and to record any resulting override or replacement authorization as a machine-readable state transition, replacement decision receipt, or both.

* * * * *